(12) United States Patent
Gogar et al.

(10) Patent No.: US 10,922,080 B2
(45) Date of Patent: Feb. 16, 2021

(54) SYSTEMS AND METHODS FOR PERFORMING VECTOR MAX/MIN INSTRUCTIONS THAT ALSO GENERATE INDEX VALUES

(71) Applicant: Intel Corporation, Santa Clara, CA (US)

(72) Inventors: Sunny L. Gogar, Beaverton, OR (US); Rama Kishan V. Malladi, Bangalore (IN); Elmoustapha Ould-Ahmed-Vall, Chandler, AZ (US); Christopher J. Hughes, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 64 days.

(21) Appl. No.: 16/147,709

(22) Filed: Sep. 29, 2018

(65) Prior Publication Data
US 2020/0104132 A1    Apr. 2, 2020

(51) Int. Cl.
*G06F 9/30* (2018.01)
*G06F 7/499* (2006.01)
*G06F 9/38* (2018.01)

(52) U.S. Cl.
CPC ...... *G06F 9/30036* (2013.01); *G06F 7/49921* (2013.01); *G06F 9/3001* (2013.01); *G06F 9/30018* (2013.01); *G06F 9/30098* (2013.01); *G06F 9/30145* (2013.01); *G06F 9/3802* (2013.01)

(58) Field of Classification Search
CPC .................................................. G06F 9/30036
See application file for complete search history.

(56) References Cited

U.S. PATENT DOCUMENTS

| 9,766,888 | B2 * | 9/2017 | Gueron | ............... | G06F 9/30021 |
| 9,996,361 | B2 * | 6/2018 | Mishra | ................... | G06F 9/3861 |
| 2003/0167460 | A1 * | 9/2003 | Desai | .................. | G06F 9/30021 717/151 |
| 2005/0149701 | A1 * | 7/2005 | Chen | ..................... | G06F 9/3001 712/221 |
| 2006/0184765 | A1 * | 8/2006 | Krueger | .................... | G06F 7/76 712/4 |
| 2014/0207836 | A1 * | 7/2014 | Mundarath | ............. | G06F 7/026 708/201 |
| 2017/0046168 | A1 * | 2/2017 | Mahurin | ............. | G06F 15/8053 |
| 2017/0286108 | A1 * | 10/2017 | Fleischer | .............. | G06F 9/3853 |
| 2018/0088945 | A1 * | 3/2018 | Plotnikov | ........... | G06F 9/30036 |

* cited by examiner

*Primary Examiner* — Jacob Petranek
(74) *Attorney, Agent, or Firm* — Nicholson De Vos Webster & Elliott LLP

(57) ABSTRACT

Disclosed embodiments relate to systems and methods for performing instructions structured to compute a min/max value of a vector. In one example, a processor executes a decoded single instruction to determine on a per data element position of the identified first and second operands a maximum or minimum, store the determined maximum or minimums in corresponding data element positions of the identified first operand, and determine and store, in each data element position of the identified third operand, an indication of where the maximum or minimum came from.

17 Claims, 26 Drawing Sheets

| OPCODE 401 | OPERAND 1 403 | OPERAND 2 405 | OPERAND 3 407 | OPERAND 4 409 |
|---|---|---|---|---|
| VMAXINDEX{SS, SD, PS, PD} | SOURCE/ DESTINATION VECTOR (SIMD) REGISTER | SOURCE VECTOR (SIMD) REGISTER/MEM | SOURCE/ DESTINATION VECTOR (SIMD) REGISTER | SOURCE VECTOR (SIMD)/ GPR REGISTER |
| VMININDEX{SS, SD, PS, PD} | SOURCE/ DESTINATION VECTOR (SIMD) REGISTER | SOURCE VECTOR (SIMD) REGISTER/MEM | SOURCE/ DESTINATION VECTOR (SIMD) REGISTER | SOURCE VECTOR (SIMD)/ GPR REGISTER |
| VMAXMASK{SS, SD, PS, PD} | DESTINATION VECTOR (SIMD) REGISTER | SOURCE VECTOR (SIMD) REGISTER | SOURCE VECTOR (SIMD) REGISTER/MEM | DESTINATION MASK REGISTER |
| VMINMASK{SS, SD, PS, PD} | DESTINATION VECTOR (SIMD) REGISTER | SOURCE VECTOR (SIMD) REGISTER | SOURCE VECTOR (SIMD) REGISTER/MEM | DESTINATION MASK REGISTER |
| VMAXMASK{SS, SD, PS, PD} | SOURCE/ DESTINATION VECTOR (SIMD) REGISTER | SOURCE VECTOR (SIMD) REGISTER | DESTINATION MASK REGISTER | |
| VMINMASK{SS, SD, PS, PD} | SOURCE/ DESTINATION VECTOR (SIMD) REGISTER | SOURCE VECTOR (SIMD) REGISTER | DESTINATION MASK REGISTER | |

FIG. 4

FETCH A SINGLE INSTRUCTION, A FORMAT OF THE SINGLE INSTRUCTION INCLUDING A FIRST FIELD TO IDENTIFY A FIRST OPERAND, A SECOND FIELD TO IDENTIFY A SECOND OPERAND, A THIRD FIELD TO IDENTIFY A THIRD OPERAND, AND AN OPCODE TO INDICATE THAT EXECUTION CIRCUITRY IS TO DETERMINE ON A PER DATA ELEMENT POSITION OF THE IDENTIFIED FIRST AND SECOND OPERANDS A MAXIMUM VALUE, STORE THE DETERMINED MAXIMUM VALUES IN CORRESPONDING DATA ELEMENT POSITIONS OF THE IDENTIFIED FIRST OPERAND, AND DETERMINE AND STORE, IN EACH DATA ELEMENT POSITION OF THE IDENTIFIED THIRD OPERAND, AN INDICATION OF WHERE THE MAXIMUM VALUE CAME FROM
501

DECODE THE FETCHED SINGLE INSTRUCTION
503

SCHEDULE EXECUTION OF THE DECODED SINGLE INSTRUCTION
505

EXECUTE THE DECODED SINGLE INSTRUCTION TO DETERMINE ON A PER DATA ELEMENT POSITION OF THE IDENTIFIED FIRST AND SECOND OPERANDS A MAXIMUM VALUE, STORE THE DETERMINED MAXIMUM VALUES IN CORRESPONDING DATA ELEMENT POSITIONS OF THE IDENTIFIED FIRST OPERAND, AND DETERMINE AND STORE, IN EACH DATA ELEMENT POSITION OF THE IDENTIFIED THIRD OPERAND, AN INDICATION OF WHERE THE MAXIMUM VALUE CAME FROM 507

COMMIT
509

FIG. 5

FETCH A SINGLE INSTRUCTION, A FORMAT OF THE SINGLE INSTRUCTION INCLUDING A FIRST FIELD TO IDENTIFY A FIRST OPERAND, A SECOND FIELD TO IDENTIFY A SECOND OPERAND, A THIRD FIELD TO IDENTIFY A THIRD OPERAND, AND AN OPCODE TO INDICATE THAT EXECUTION CIRCUITRY IS TO DETERMINE ON A PER DATA ELEMENT POSITION OF THE IDENTIFIED FIRST AND SECOND OPERANDS A MINIMUM VALUE, STORE THE DETERMINED MINIMUM VALUES IN CORRESPONDING DATA ELEMENT POSITIONS OF THE IDENTIFIED FIRST OPERAND, AND DETERMINE AND STORE, IN EACH DATA ELEMENT POSITION OF THE IDENTIFIED THIRD OPERAND, AN INDICATION OF WHERE THE MINIMUM VALUE CAME FROM
601

↓

DECODE THE FETCHED SINGLE INSTRUCTION
603

↓

SCHEDULE EXECUTION OF THE DECODED SINGLE INSTRUCTION
605

↓

EXECUTE THE DECODED SINGLE INSTRUCTION TO DETERMINE ON A PER DATA ELEMENT POSITION OF THE IDENTIFIED FIRST AND SECOND OPERANDS A MINIMUM VALUE, STORE THE DETERMINED MINIMUM VALUES IN CORRESPONDING DATA ELEMENT POSITIONS OF THE IDENTIFIED FIRST OPERAND, AND DETERMINE AND STORE, IN EACH DATA ELEMENT POSITION OF THE IDENTIFIED THIRD OPERAND, AN INDICATION OF WHERE THE MINIMUM VALUE CAME FROM 607

↓

COMMIT
609

FIG. 6

FETCH A SINGLE INSTRUCTION, A FORMAT OF THE SINGLE INSTRUCTION INCLUDING A FIRST FIELD TO IDENTIFY A FIRST OPERAND, A SECOND FIELD TO IDENTIFY A SECOND OPERAND, A THIRD FIELD TO IDENTIFY A THIRD OPERAND, AND AN OPCODE TO INDICATE THAT EXECUTION CIRCUITRY IS TO DETERMINE ON A PER DATA ELEMENT POSITION OF THE IDENTIFIED FIRST AND SECOND OPERANDS A MINIMUM VALUE, STORE THE DETERMINED MINIMUM VALUES IN CORRESPONDING DATA ELEMENT POSITIONS OF THE IDENTIFIED FIRST OPERAND, AND DETERMINE AND STORE, IN EACH DATA ELEMENT POSITION OF THE IDENTIFIED THIRD OPERAND, AN INDICATION OF WHERE THE MINIMUM VALUE CAME FROM
701

DECODE THE FETCHED SINGLE INSTRUCTION
703

SCHEDULE EXECUTION OF THE DECODED SINGLE INSTRUCTION
705

EXECUTE THE DECODED SINGLE INSTRUCTION TO DETERMINE ON A PER DATA ELEMENT POSITION OF THE IDENTIFIED THIRD AND SECOND OPERANDS A MINIMUM VALUE, STORE THE DETERMINED MINIMUM VALUES IN CORRESPONDING DATA ELEMENT POSITIONS OF THE IDENTIFIED FIRST OPERAND, AND DETERMINE AND STORE, IN EACH DATA ELEMENT POSITION OF THE IDENTIFIED FOURTH OPERAND, AN INDICATION OF WHERE THE CORRESPONDING MINIMUM VALUE CAME FROM 707

COMMIT
709

FIG. 7

FETCH A SINGLE INSTRUCTION, A FORMAT OF THE SINGLE INSTRUCTION INCLUDING A FIRST FIELD TO IDENTIFY A FIRST OPERAND, A SECOND FIELD TO IDENTIFY A SECOND OPERAND, A THIRD FIELD TO IDENTIFY A THIRD OPERAND, AND AN OPCODE TO INDICATE THAT EXECUTION CIRCUITRY IS TO DETERMINE ON A PER DATA ELEMENT POSITION OF THE IDENTIFIED FIRST AND SECOND OPERANDS A MAXIMUM VALUE, STORE THE DETERMINED MAXIMUM VALUES IN CORRESPONDING DATA ELEMENT POSITIONS OF THE IDENTIFIED FIRST OPERAND, AND DETERMINE AND STORE, IN EACH DATA ELEMENT POSITION OF THE IDENTIFIED THIRD OPERAND, AN INDICATION OF WHERE THE MAXIMUM VALUE CAME FROM
801

DECODE THE FETCHED SINGLE INSTRUCTION
803

SCHEDULE EXECUTION OF THE DECODED SINGLE INSTRUCTION
805

EXECUTE THE DECODED SINGLE INSTRUCTION TO DETERMINE ON A PER DATA ELEMENT POSITION OF THE IDENTIFIED THIRD AND SECOND OPERANDS A MAXIMUM VALUE, STORE THE DETERMINED MAXIMUM VALUES IN CORRESPONDING DATA ELEMENT POSITIONS OF THE IDENTIFIED FIRST OPERAND, AND DETERMINE AND STORE, IN EACH DATA ELEMENT POSITION OF THE IDENTIFIED FOURTH OPERAND, AN INDICATION OF WHERE THE CORRESPONDING MAXIMUM VALUE CAME FROM 807

COMMIT
809

FIG. 8

```
double curMaxValueLane[VECSIZE] = {0.0f};
unsigned int curMaxIndexLane[VECSIZE] = {0};
double strengthLane[VECSIZE] = {0.0f};
curMaxValue = 0.0f;
curMaxIndex = 0;

for(unsigned int i=0; i<elements; i+=VECSIZE)
{
    #pragma omp simd
    for(unsigned int j=0; j<VECSIZE; j++)
    {
        strengthLane[j] = inputArray[j+i] ;
        if(strengthLane[j] >= curMaxValueLane[j])
        {
            curMaxValueLane[j] = strengthLane[j];
            curMaxIndexLane[j] = i+j;
        }
    }
}
for(unsigned int j=0; j<VECSIZE; j++)
{
    if(curMaxValueLane[j] >= curMaxValue)
    {
        curMaxValue = curMaxValueLane[j];
        curMaxIndex = curMaxIndexLane[j];
    }
}
```

FIG. 9

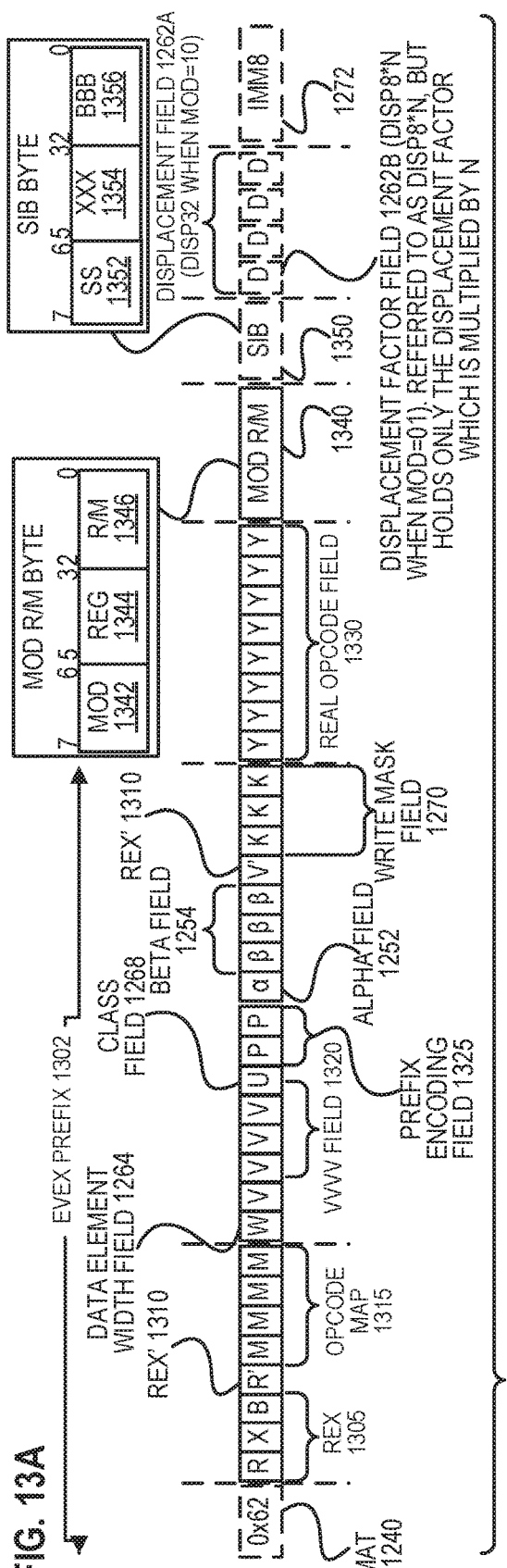
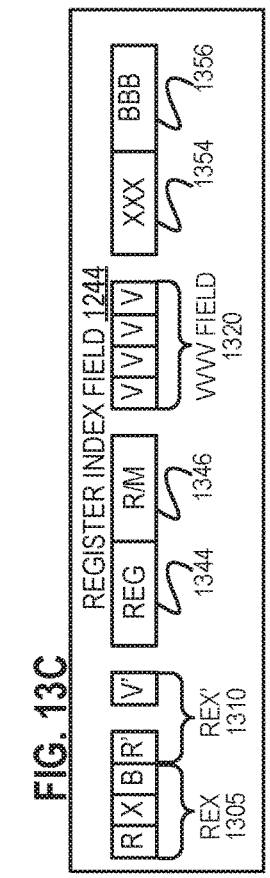
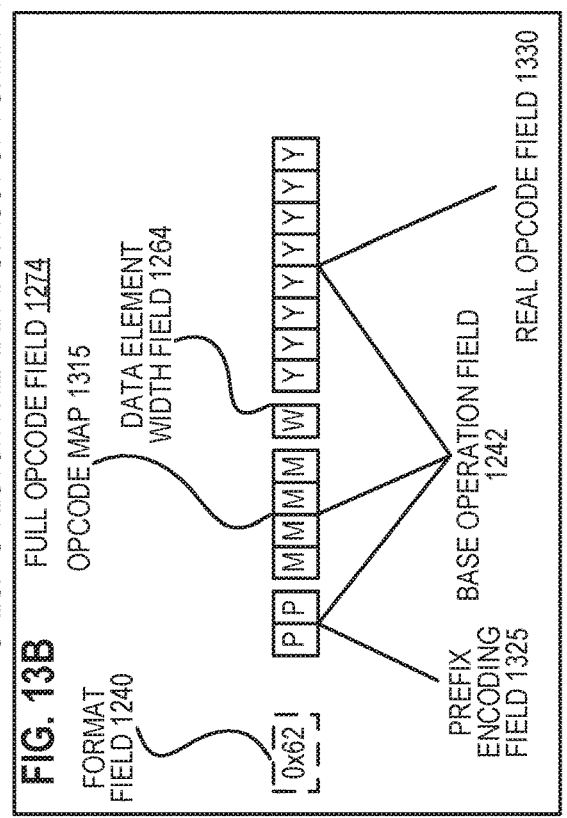

FIG. 14
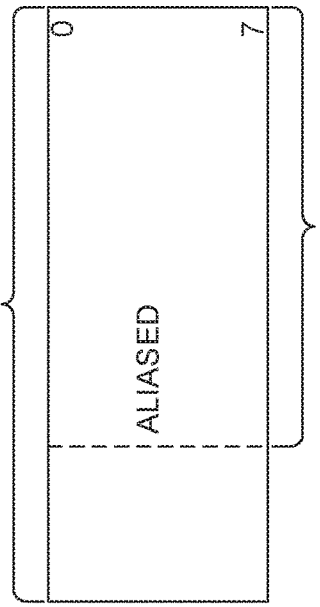
SCALAR FP STACK REGISTER FILE 1445 (X87FP) 80 BITS
ALIASED
MMX PACKED INT FLAT REGISTER FILE 1450 64 BITS
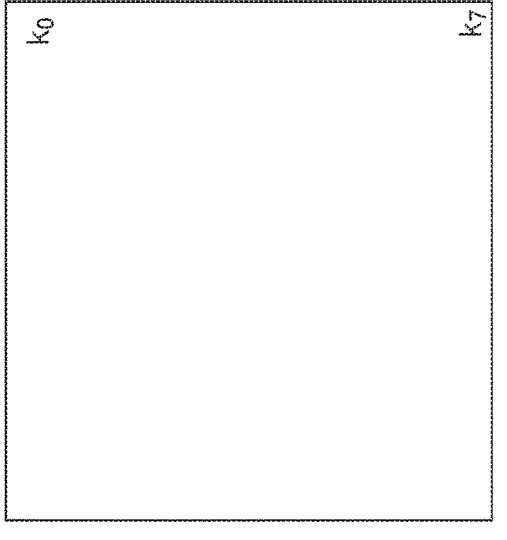
Write Mask Registers 1415 64 BITS
REGISTER ARCHITECTURE 1400
General Purpose Registers 1425 16 X 64 BITS
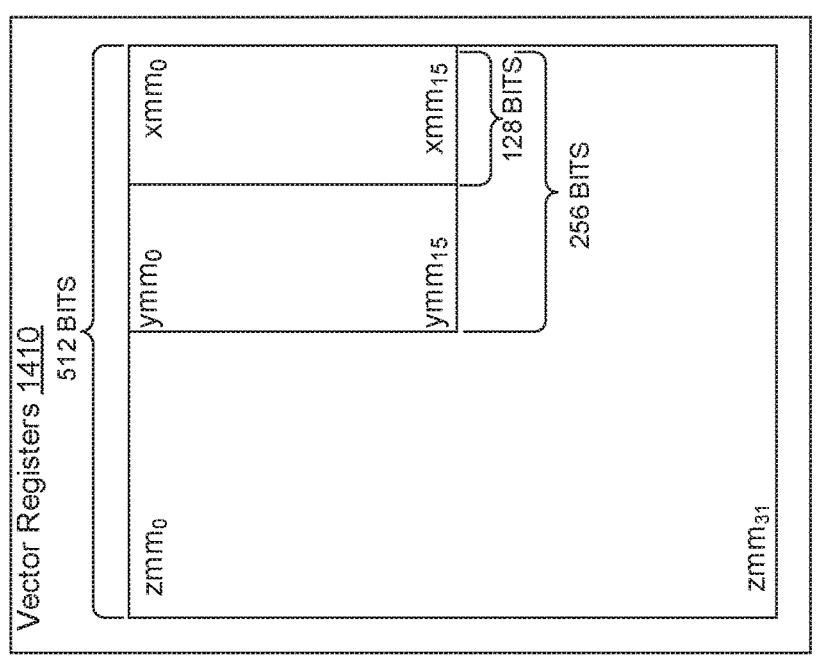
Vector Registers 1410 512 BITS

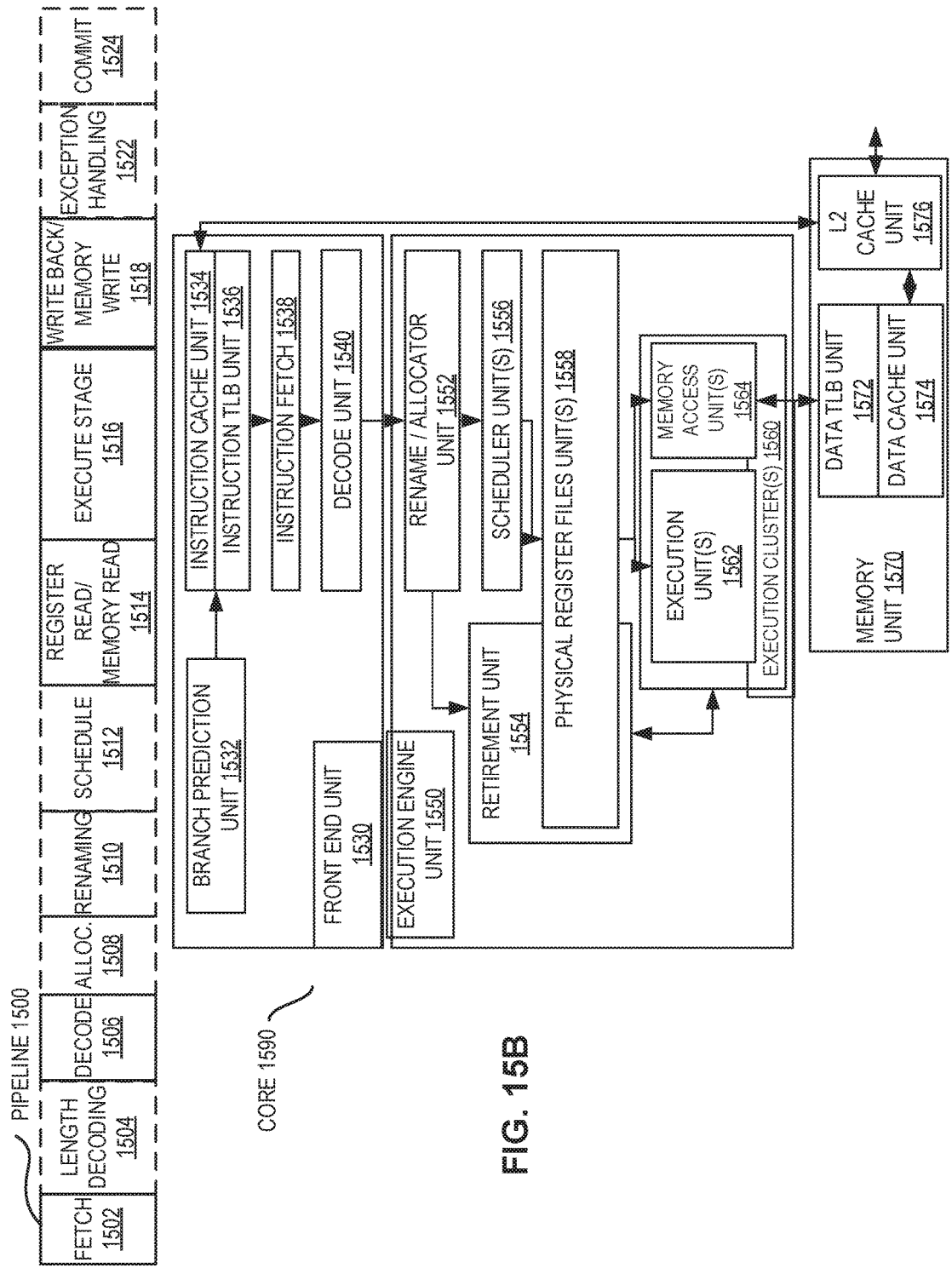

SYSTEMS AND METHODS FOR PERFORMING VECTOR MAX/MIN INSTRUCTIONS THAT ALSO GENERATE INDEX VALUES

FIELD OF INVENTION

The field of invention relates generally to computer processor architecture, and, more specifically, to systems and methods for performing instructions specifying vector operations.

BACKGROUND

The maximum or minimum element is utilized in signal and image processing, machine learning, and other application domains. Often, application program interfaces and high-level language program applications provide higher level functions to give users the ability to implement the functionality of computing the maximum and minimum element. The functions provided by such applications are then converted at a low level to several instructions on the underlying hardware resulting in inefficient processing outcomes and increased processing speed.

Efficiently computing the maximum or minimum element of a vector and simultaneously capturing the index of the minimum or maximum element may assist in meeting the needs of processors, for example, performing computations of big data in a data center or other computations of the minimum or maximum element.

BRIEF DESCRIPTION OF THE DRAWINGS

The present invention is illustrated by way of example and are not limitations in the figures of the accompanying drawings, in which like references indicate similar elements and in which:

FIG. 4 illustrates examples of embodiments of portions of an instruction format for min/max instructions detailed herein.

FIG. 5 illustrates examples of embodiments of a method of processing a maximum and index instruction (such as VMAXINDEX{ } detailed herein).

FIG. 6 illustrates examples of embodiments of a method of processing a minimum and index instruction (such as VMININDEX{ } detailed herein).

FIG. 7 illustrates examples of embodiments of a method of processing a minimum and index instruction (such as VMINMASK{ } detailed herein).

FIG. 8 illustrates examples of embodiments of a method of processing a maximum and index instruction (such as VMAXMASK{ } detailed herein).

FIG. 9 illustrates exemplary pseudocode for a max and index execution.

FIGS. 13A-D illustrate an exemplary specific vector friendly instruction format according to embodiments of the invention;

FIG. 14 is a block diagram of a register architecture according to one embodiment of the invention;

FIG. 15A is a block diagram illustrating both an exemplary in-order pipeline and an exemplary register renaming, out-of-order issue/execution pipeline according to embodiments of the invention;

FIG. 15B is a block diagram illustrating both an exemplary embodiment of an in-order architecture core and an exemplary register renaming, out-of-order issue/execution architecture core to be included in a processor according to embodiments of the invention;

DETAILED DESCRIPTION

Figure 1A:
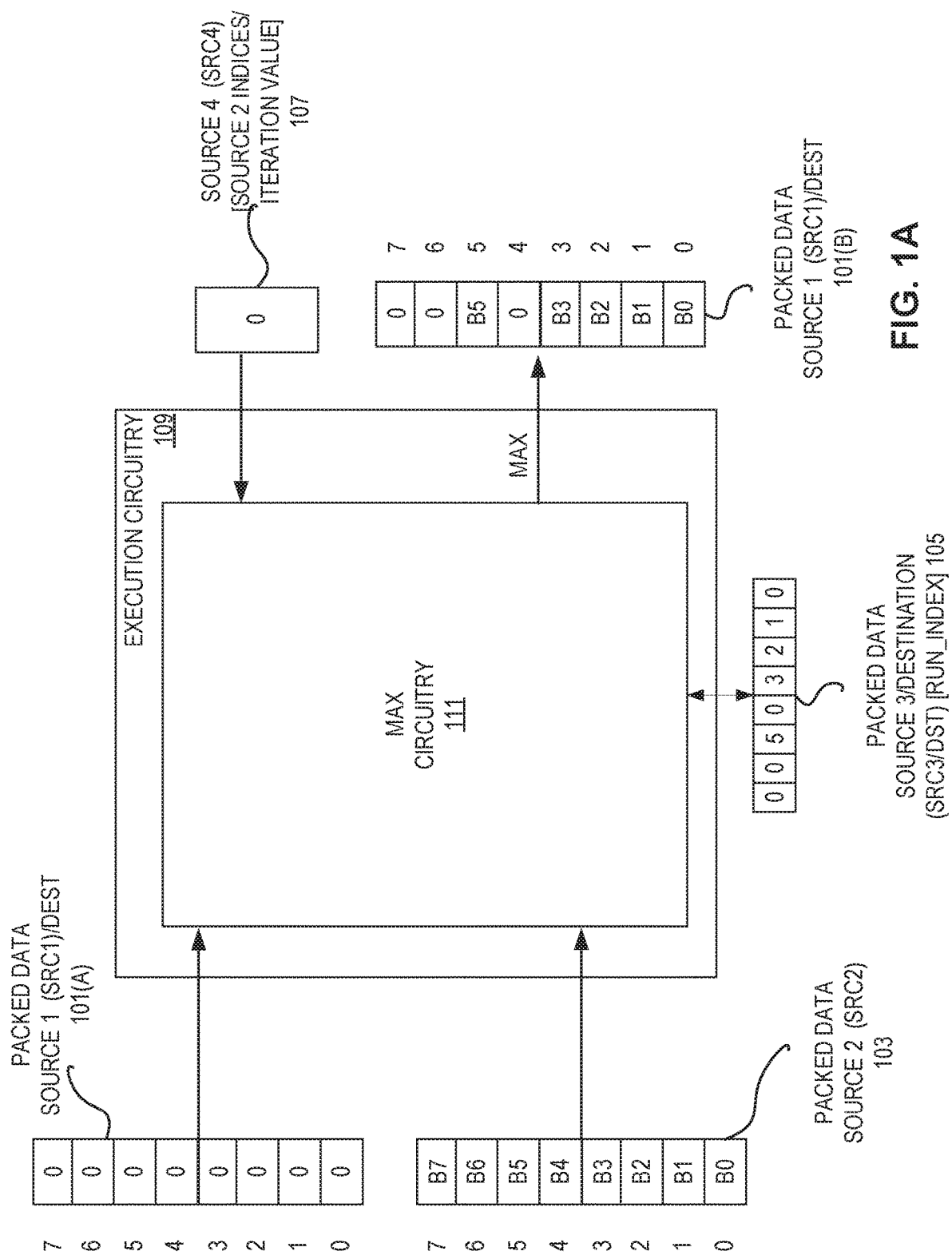
FIGS. 1A-C illustrates embodiments of an exemplary execution of an instruction to determine a maximum value between element positions of two identified source locations and store the maximum value in the corresponding element position of one of the identified source locations.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Consider a simple example below to compute a maximum (max) and a max and index:

```
max
loop j
{
        If(a[j] > max)
        {
            max = a[j];
        }
}
```

```
max and index
loop j
{
    If(a[j] > max)
    {
        max = a[j];
        max_idx = j;
    }
}
```

Compilers can recognize this max computation idiom and generate an optimal assembly sequence using vector instructions such vmaxps as shown above. To determine the max index (max_idx), the compiler generates additional assembly instructions such as vcmpps and vpaddd. This is the best performing assembly sequence generated given the processor ISA (instruction set). A similar sequence would be applicable for computing a min value.

The number of instructions needed to determine the index and a min or max is 4. But, to determine the min or max, only 1 instruction is needed. Detailed herein are embodiments of an instruction, instruction format, and supporting hardware that allow for the completion of a max+index computation using a single instruction. In particular, embodiments of a vector instruction to find the min or max value and its index (and support thereof) are described. This removes redundant compare, mask instructions in the min/max+index computation shown above.

For example, two code snippets are shown below. The first does not use a vmaxindex instruction and the second does.

| Inefficient (4 instructions) | Single Instruction |
|---|---|
| vcmpps $14, %zmm0, %zmm3, %k1 | vmaxidxps %zmm0, %zmm3, %zmm4, %zmm2 |
| vmaxps %zmm0, %zmm3, %zmm0 | |
| vmovps %zmm4, %zmm1 {%k1} | |
| vpaddd %zmm5, %zmm4, %zmm4 | |

Also detailed herein are embodiments of a min/max determining instruction that generates a mask indicating which element was chosen as the min/max. That mask can be used to then update one or more vector registers holding information associated with the min/max, such as the index, with simple masked mov instructions.

The instructions and support detailed herein improve performance of loops that have a max or min computation along with their index. Consider the code snippets below for computing a min or max+index.

FIG. 1A illustrates embodiments of an exemplary execution of an instruction to determine a maximum value between element positions of two identified source locations and store the maximum value in the corresponding element position of one of the identified source locations (as a destination). The execution also outputs an index in a packed data register (such as a single instruction, multiple data (SIMD) or vector register). The index identifying, per element position, of where the maximum was found. Additionally, a source of an iteration value or source 2 indices is provided.

In this example, there are four operands of the instruction the location of which are identified in one or more fields of the instruction (for example, vmaxidxps src1/dest, src2, src3/dest, src4). In some embodiments, each of the operands is a source and two of the operands also serve as destinations. As shown, source 1 101(A) and source 2 103 are packed data operands such as vector registers or values pulled from a memory location. Source 1 also serves as a destination to store the maximum value of each determination made by max circuitry 111. In some implementations, this max circuitry 111 includes a plurality of comparators that operate in parallel. The result is shown in source 1/dest 101(B). As shown, the "B" values of the source 2 103 are not always larger than those of the source 1 101(A) which was all zeros. Note minimum circuitry would be used for determining minimums.

The max circuitry 111 also generates an index (at times referred to as a "run index") 105 which details where in the source 2 103 the corresponding minimum was found. When the source 2 1 is a subsection of a larger vector or array (such as an array of 24 elements (e.g., B0 through B23)), this index notes where in the array the minimum was found. A fourth source 107 (such as general-purpose register (GPR) or packed data register) provides an iteration value or indices into the second source that is used to help determine the run index.

Figure 1B:
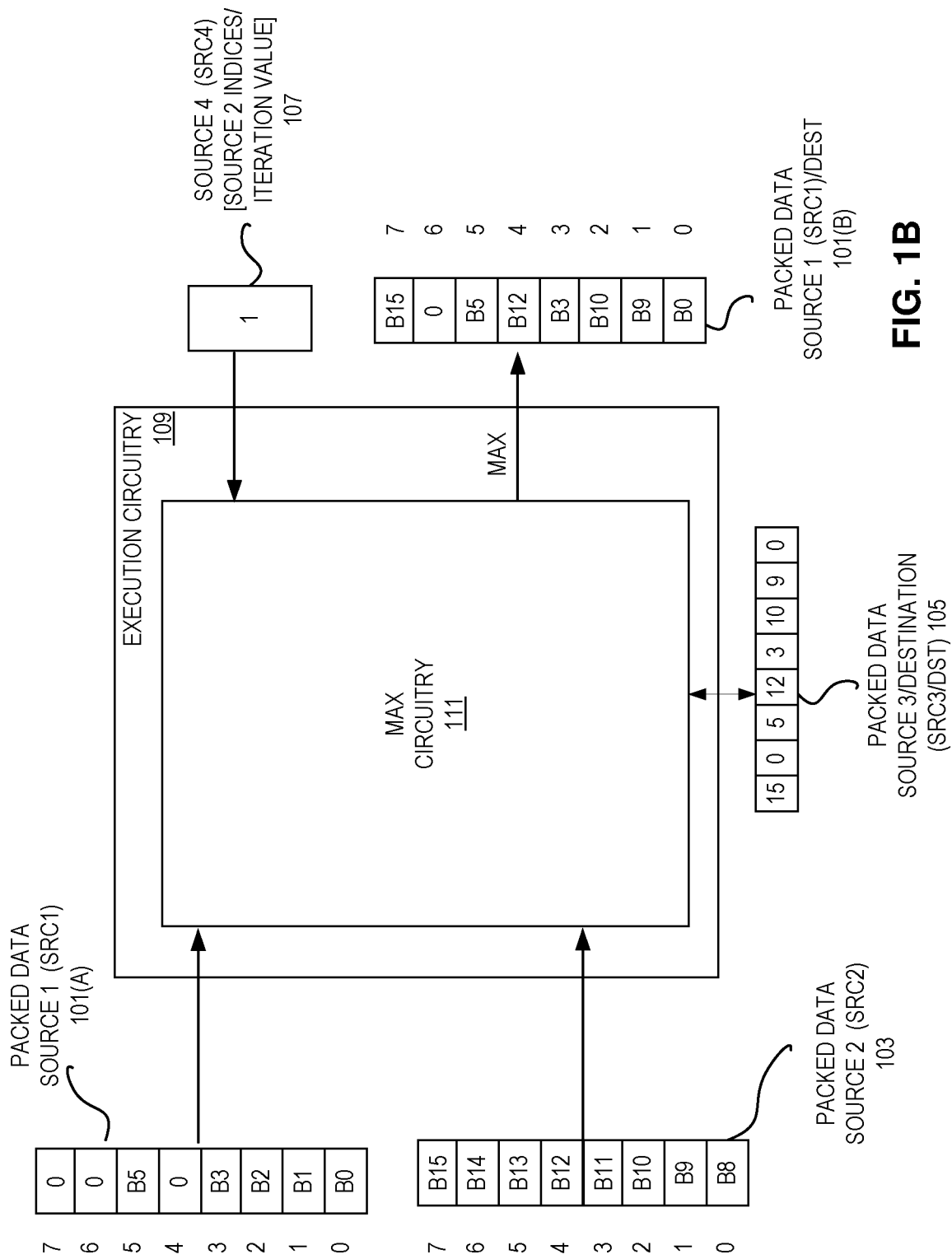

FIG. 1B illustrates embodiments of an exemplary execution of an instruction to determine a maximum value between element positions of two identified source locations and store the maximum value in the corresponding element position of one of the identified source locations (as a destination). In this example, the output stored in source 1 101(B) of FIG. 1(A) is the source 1 input 101(A). Another set of data elements from the array form the second source 103. The fourth source 104 notes this is iteration 1 (the second iteration in a sequence).

The max circuitry 111 compares the source 1 101(A) and source 2 103 values and generates the result stored in 101(B). The third source/destination 105 is updated to reflect the overall position in the array based on the iteration value. For example, the second element now shows that the element in position 9 of the array was the maximum.

Figure 1C:
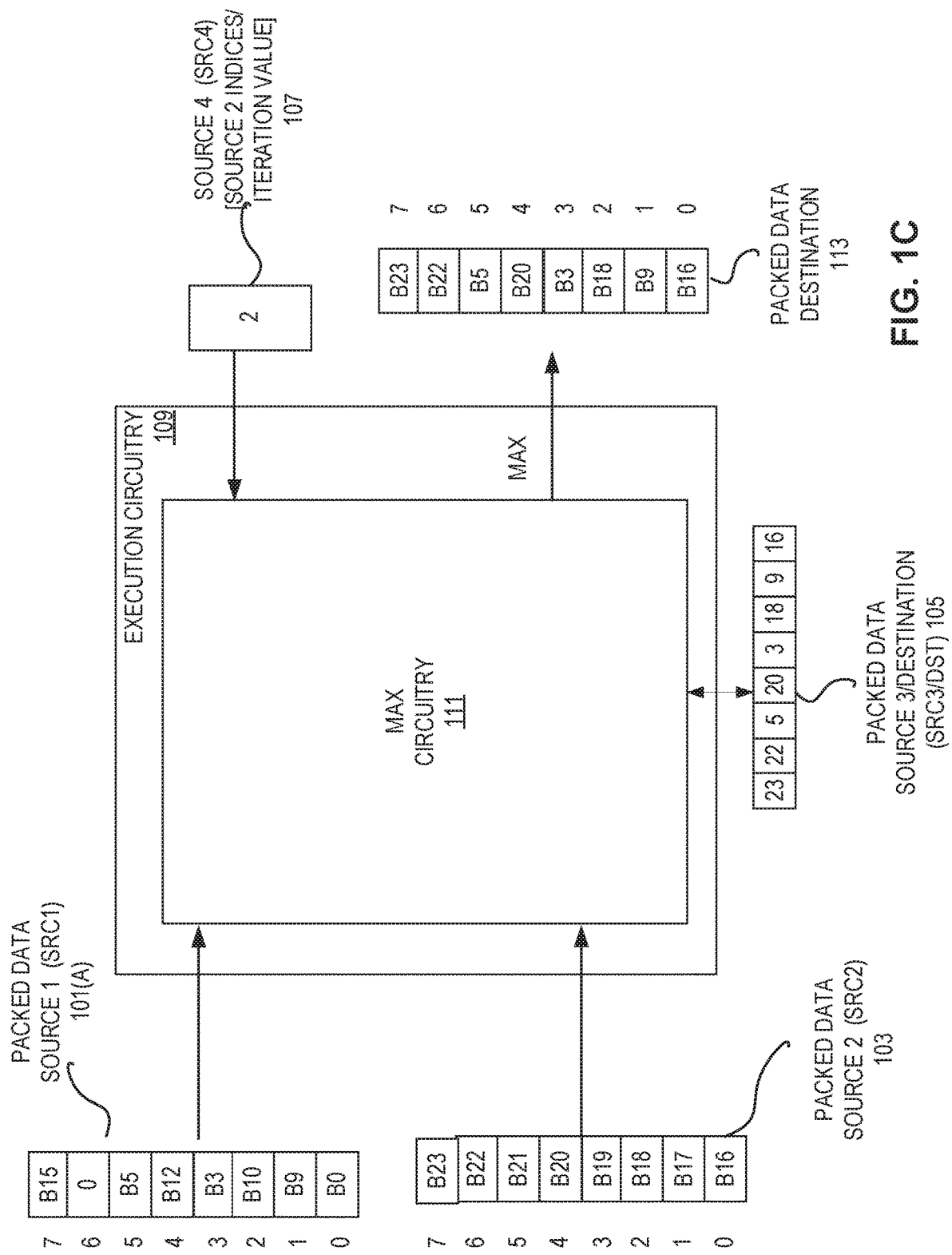

FIG. 1(C) illustrates embodiments of an exemplary execution of an instruction to determine a maximum value between element positions of two identified source locations and store the maximum value in the corresponding element position of one of the identified source locations (as a destination). In this example, the output stored in source 1 101(B) of FIG. 1(B) of the is the source 1 input 101(A). Another set of data elements from the array form the second source 103. The fourth source 104 notes this is iteration 3 (the third iteration in a sequence).

The max circuitry 111 compares the source 1 101(A) and source 2 103 values and generates the result stored in 101(B). The third source/destination 105 is updated to reflect the overall position in the array based on the iteration value. For example, the first element now shows that the element in position 16 of the array was the maximum.

Figure 2:
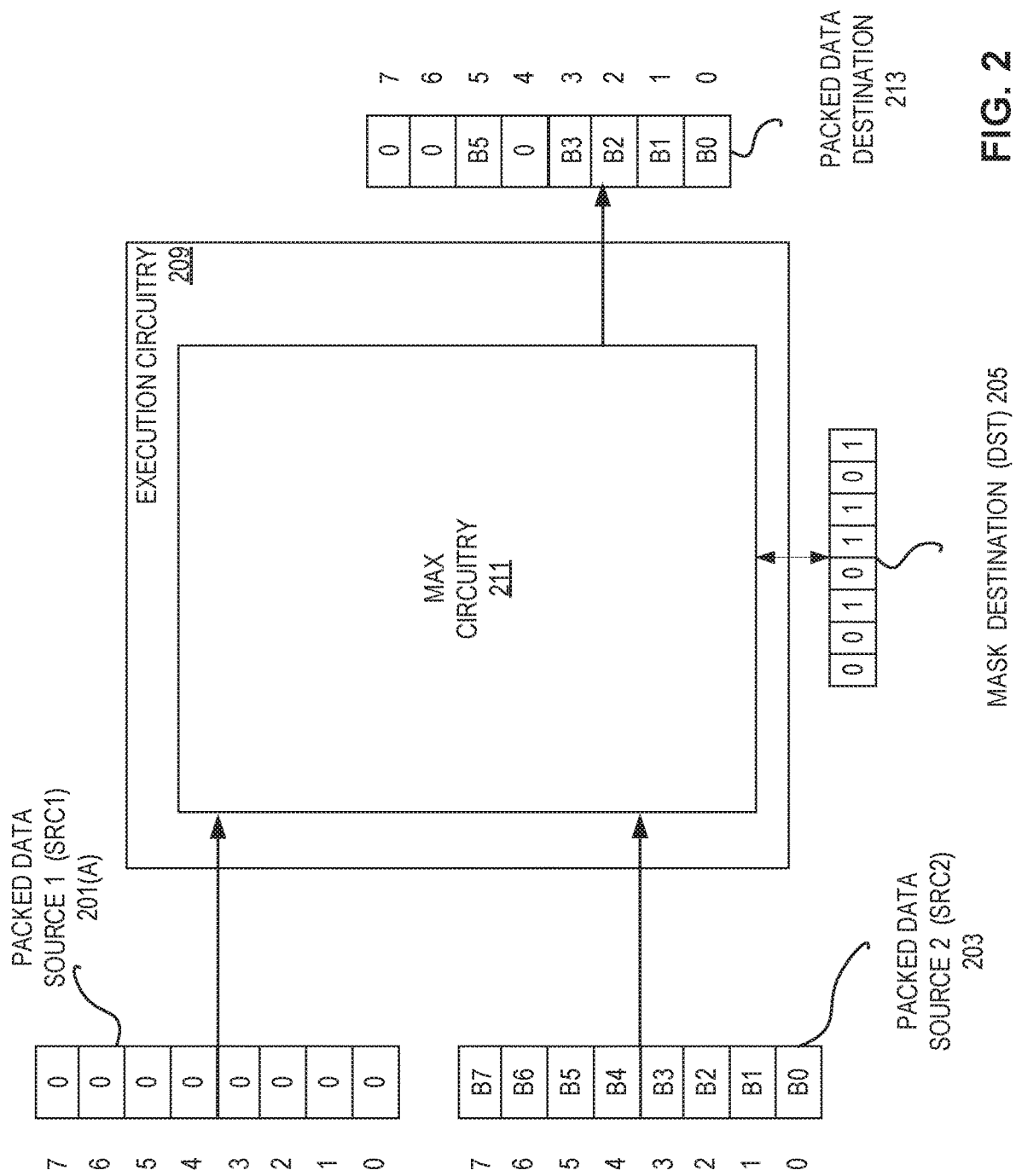
FIG. 2 illustrates embodiments of an exemplary execution of an instruction to determine a maximum value between element positions of two identified source locations and store the maximum value in the corresponding element position of an identified destination location.

FIG. 2 illustrates embodiments of an exemplary execution of an instruction to determine a maximum value between element positions of two identified source locations and store the maximum value in the corresponding element position of an identified destination location. The execution also outputs an index in a packed data register (such as a single instruction, multiple data (SIMD) or vector register) or writemask register of which of the two source operands stored the maximum value. The index identifying, per element position, of where the maximum was found.

In this example, there are four operands of the instruction the location of which are identified in one or more fields of the instruction (for example, vmaxmaskps dest, src1, src2, maskdest). As shown, source 1 201(A) and source 2 203 are packed data operands such as vector registers or values pulled from a memory location.

In some implementations, the max circuitry 211 includes a plurality of comparators that operate in parallel to determine which value is the maximum. The result is shown in destination 213. As shown, the "B" values of the source 2 203 are not always larger than those of the source 1 201(A) which was all zeros. Note minimum circuitry would be used for determining minimums.

The max circuitry 211 also generates an index or mask 205 which details, per corresponding position, if the maximum value came from the first source (shown as a 0) or from the second source (shown as a 1).

Further, a mask parameter may include metadata or information associated with the min/max value (e.g., the maximum or minimum element value). For example, the mask parameter may include the class information corresponding to the maximum element. In some embodiments, other attributes or properties of the min/max element are tracked. For example, traversing down the elements of a binary search tree, in addition to the value of the node, the value of its parent node can be tracked. Or, while finding the max/min value of an attribute in a large database table, some other attribute of the max/min element found (such as the row of interest) can be tracked without having to go back and load (or read) the table again to query that other attribute of the same max/min element (such as the row of interest) when the max/min element has been found. The mask parameter may be stored, retrieved from, or otherwise provided by one or more registers according to the instruction.

Additional instructions may use this mask parameter to select metadata or information associated with the min/max value (e.g., the maximum or minimum element value), and place that into other vector registers. For example, a movaps instruction in may take class information from a register, and selectively copy that information into the corresponding elements of another register; this copying is only done for elements where the min/max value came from the second operand. The mask parameter may be stored, retrieved from, or otherwise provided by one or more registers (e.g., register k1, k2, and/or any other like register).

Figure 3:
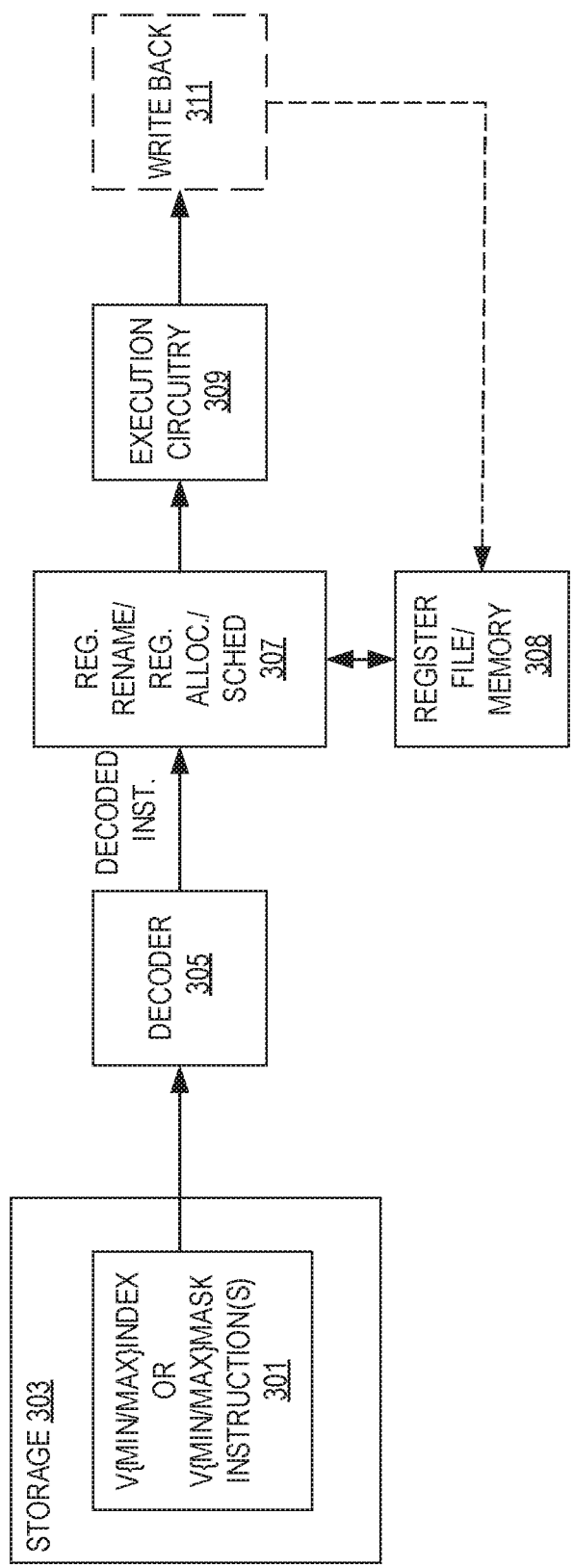
FIG. 3 illustrates an embodiment of hardware to process an instruction such as a vminindex, vmaxindex, vminmask, or vmaxmask instruction.

FIG. 3 illustrates an embodiment of hardware to process an instruction such as a vminindex, vmaxindex, vminmask, or vmaxmask instruction. As illustrated, storage 301 stores one or more of these instruction to be executed.

Fetched instructions (including the ones described herein) are received by decode circuitry 305. For example, the decode circuitry 305 receives this instruction from fetch logic/circuitry. The instruction 301 includes fields for an opcode and operands as detailed herein. In some embodiments, the source[s] and destination are registers, and in other embodiments one or more are memory locations. More detailed embodiments of at least one instruction format will be detailed later. The decode circuitry 305 decodes the instruction into one or more operations. In some embodiments, this decoding includes generating a plurality of micro-operations to be performed by execution circuitry (such as execution circuitry). The decode circuitry 305 also decodes instruction prefixes (if used).

In some embodiments, register renaming, register allocation, and/or scheduling circuitry 307 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

Registers (register file) and/or memory 308 store data as operands of the instruction to be operated on by execution circuitry. Exemplary register types include packed data registers, general purpose registers, and floating-point registers.

Execution circuitry 309 executes the decoded instruction. Exemplary detailed execution circuitry was shown in FIG. 1 for maximum determinations.

In some embodiments, the execution of a decoded vmin-index instruction causes the execution circuitry to at least determine on a per data element position of an identified first and second operands a minimum value, store the determined minimum values in corresponding data element positions of the identified first operand, and determine and store, in each data element position of the identified third operand, an indication of where the corresponding minimum value came from. Further, in some embodiments, an identified fourth operand is used to determine the indication of where the minimum value came from in an array.

In some embodiments, the execution of a decoded vmax-index instruction causes the execution circuitry to at least determine on a per data element position of an identified first and second operands a maximum value, store the determined maximum values in corresponding data element positions of the identified first operand, and determine and store, in each data element position of the identified third operand, an indication of where the corresponding maximum value came from. Further, in some embodiments, an identified fourth operand is used to determine the indication of where the maximum value came from in an array.

In some embodiments, the execution of a decoded vmin-mask instruction causes the execution circuitry to at least determine on a per data element position of an identified third and second operands a minimum value, store the determined minimum values in corresponding data element positions of an identified first operand, and determine and store, in each data element position of an identified fourth operand, an indication of where the corresponding minimum value came from.

In some embodiments, the execution of a decoded vmax-mask instruction causes the execution circuitry to at least determine on a per data element position of an identified third and second operands a maximum value, store the determined maximum values in corresponding data element positions of an identified first operand, and determine and store, in each data element position of an identified fourth operand, an indication of where the corresponding maximum value came from.

In some embodiments, the execution of a decoded vmin-mask instruction causes the execution circuitry to at least determine on a per data element position of an identified first and second operands a minimum value, store the determined minimum values in corresponding data element positions of the identified first operand, and determine and store, in each data element position of an identified third operand, an indication of where the corresponding minimum value came from.

In some embodiments, the execution of a decoded vmax-mask instruction causes the execution circuitry to at least determine on a per data element position of an identified first and second operands a maximum value, store the determined maximum values in corresponding data element positions of the identified first operand, and determine and store, in each data element position of an identified third operand, an indication of where the corresponding maximum value came from.

Write back (retirement) circuitry 311 commits the result of the execution of the decoded instruction.

FIG. 4 illustrates examples of embodiments of portions of an instruction format for min/max instructions detailed herein. As shown an opcode 401 indicates what function to perform (max and index, max and mask, etc.) and the type of data element (scalar single (ss), scalar double (ss), packed single (ps), packed double (pd). In some embodiments, the opcode is as detailed with respect to FIG. 13. The locations of the 4 operands 403, 405, 407, and 409 are provided in fields such as 1350. 1344, 1346, 1270. etc. These locations may be a register (GPR or vector), writemask register, or memory.

FIG. 5 illustrates examples of embodiments of a method of processing a maximum and index instruction (such as VMAXINDEX{ } detailed herein). The processing of the method is performed by components of a processor or core including, but not limited to, circuitry detailed in FIGS. 1, 3, and 15.

At 501, a single instruction is fetched. The single instruction having a format including a first field to identify a first operand, a second field to identify a second operand, a third field to identify a third operand, and an opcode to indicate that execution circuitry is to determine on a per data element position of the identified first and second operands a maximum value, store the determined maximum values in corresponding data element positions of the identified first operand, and determine and store, in each data element position of the identified third operand, an indication of where the maximum value came from.

At 503, the fetched single instruction is decoded. In some embodiments, the decoding is performed by a decode circuit. In some embodiments, the decoding is performed after a binary translation. In other embodiments, binary translation occurs after decode.

In some embodiments, the execution of the decoded single instruction is scheduled at 505. This may include retrieving operands, etc.

At 507, the decoded single instruction (or a translated version thereof) is executed by execution circuitry to determine on a per data element position of the identified first and second operands a maximum value, store the determined maximum values in corresponding data element positions of the identified first operand, and determine and store, in each data element position of the identified third operand, an indication of where the maximum value came from. Further, in some embodiments, an identified fourth operand is used to determine the indication of where the minimum value came from in an array.

At 509, the result of the execution is committed in some embodiments.

FIG. 6 illustrates examples of embodiments of a method of processing a minimum and index instruction (such as VMININDEX{ } detailed herein). The processing of the method is performed by components of a processor or core including, but not limited to, circuitry detailed in FIGS. 1, 3, and 15.

At 601, a single instruction is fetched. The single instruction having a format including a first field to identify a first operand, a second field to identify a second operand, a third field to identify a third operand, and an opcode to indicate that execution circuitry is to determine on a per data element position of the identified first and second operands a minimum value, store the determined minimum values in corresponding data element positions of the identified first operand, and determine and store, in each data element position of the identified third operand, an indication of where the minimum value came from.

At 603, the fetched single instruction is decoded. In some embodiments, the decoding is performed by a decode circuit. In some embodiments, the decoding is performed after a binary translation. In other embodiments, binary translation occurs after decode.

In some embodiments, the execution of the decoded single instruction is scheduled at 605. This may include retrieving operands, etc.

At 607, the decoded single instruction (or a translated version thereof) is executed by execution circuitry to determine on a per data element position of the identified first and second operands a minimum value, store the determined minimum values in corresponding data element positions of the identified first operand, and determine and store, in each data element position of the identified third operand, an indication of where the minimum value came from. Further, in some embodiments, an identified fourth operand is used to determine the indication of where the minimum value came from in an array.

At 609, the result of the execution is committed in some embodiments.

FIG. 7 illustrates examples of embodiments of a method of processing a minimum and index instruction (such as VMINMASK{ } detailed herein). The processing of the method is performed by components of a processor or core including, but not limited to, circuitry detailed in FIGS. 1, 3, and 15.

At 701, a single instruction is fetched. The single instruction having a format including a first field to identify a first operand, a second field to identify a second operand, a third field to identify a third operand, a fourth field to identify a fourth operand and an opcode to indicate that execution circuitry is to determine on a per data element position of the identified third and second operands a minimum value, store the determined minimum values in corresponding data element positions of the identified first operand, and determine and store, in each data element position of the identified fourth operand, an indication of where the corresponding minimum value came from.

At 703, the fetched single instruction is decoded. In some embodiments, the decoding is performed by a decode circuit. In some embodiments, the decoding is performed after a binary translation. In other embodiments, binary translation occurs after decode.

In some embodiments, the execution of the decoded single instruction is scheduled at 705. This may include retrieving operands, etc.

At 707, the decoded single instruction (or a translated version thereof) is executed by execution circuitry to determine on a per data element position of the identified third and second operands a minimum value, store the determined minimum values in corresponding data element positions of the identified first operand, and determine and store, in each data element position of the identified fourth operand, an indication of where the corresponding minimum value came from.

At 709, the result of the execution is committed in some embodiments.

FIG. 8 illustrates examples of embodiments of a method of processing a maximum and index instruction (such as VMAXMASK{ } detailed herein). The processing of the method is performed by components of a processor or core including, but not limited to, circuitry detailed in FIGS. 1, 3, and 15.

At 801, a single instruction is fetched. The single instruction having a format including a first field to identify a first operand, a second field to identify a second operand, a third field to identify a third operand, a fourth field to identify a fourth operand and an opcode to indicate that execution circuitry is to determine on a per data element position of the identified third and second operands a maximum value, store the determined maximum values in corresponding data element positions of the identified first operand, and determine and store, in each data element position of the identified fourth operand, an indication of where the corresponding maximum value came from.

At 803, the fetched single instruction is decoded. In some embodiments, the decoding is performed by a decode circuit. In some embodiments, the decoding is performed after a binary translation. In other embodiments, binary translation occurs after decode.

In some embodiments, the execution of the decoded single instruction is scheduled at 805. This may include retrieving operands, etc.

At 807, the decoded single instruction (or a translated version thereof) is executed by execution circuitry to determine on a per data element position of the identified third and second operands a maximum value, store the determined maximum values in corresponding data element positions of the identified first operand, and determine and store, in each data element position of the identified fourth operand, an indication of where the corresponding maximum value came from.

At 809, the result of the execution is committed in some embodiments.

FIG. 9 illustrates exemplary pseudocode for a max and index execution.

Figure 10:
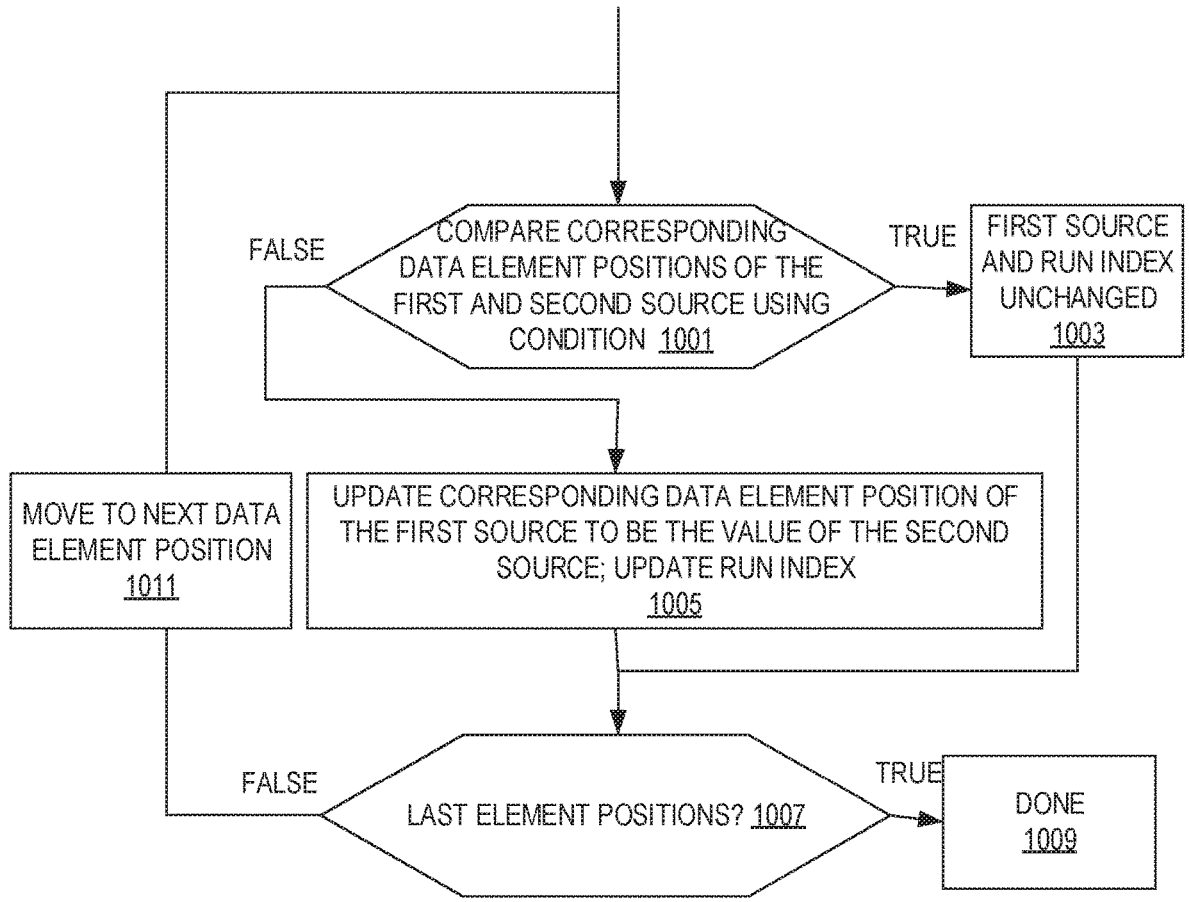
FIG. 10 illustrates an embodiment of an execution portion of execution a min and index or max and index instruction.

FIG. 10 illustrates an embodiment of an execution portion of execution a min and index or max and index instruction.

At 1001, a comparison is made between data elements of corresponding data element positions of the first and second sources. The condition is either to determine a maximum or a minimum depending on the instruction. When the condition is true, such that the element from the first source is the minimum (for a minimum comparison) or a maximum (for a maximum comparison), then the first source at that position and the run index remain unchanged at 1003.

When the condition is false, such that the element from the second source is the minimum (for a minimum comparison) or a maximum (for a maximum comparison), then the first source at that position is changed and the run index is updated to reflect this location at 1005. In some embodiments, the run index position is in an array and the run index is updated to identify the position in the array based on the source or iteration value provided in the instruction.

A determination of if the compared element positions were the last to evaluation is made at 1007. When all element positions of the first and second sources have been evaluated then the execution is done at 1009. second When all element positions of the first and second sources have not been evaluated then the process moves to the next data element position at 1011 and the elements of those data element positions are compared at 1001.

Figure 11:
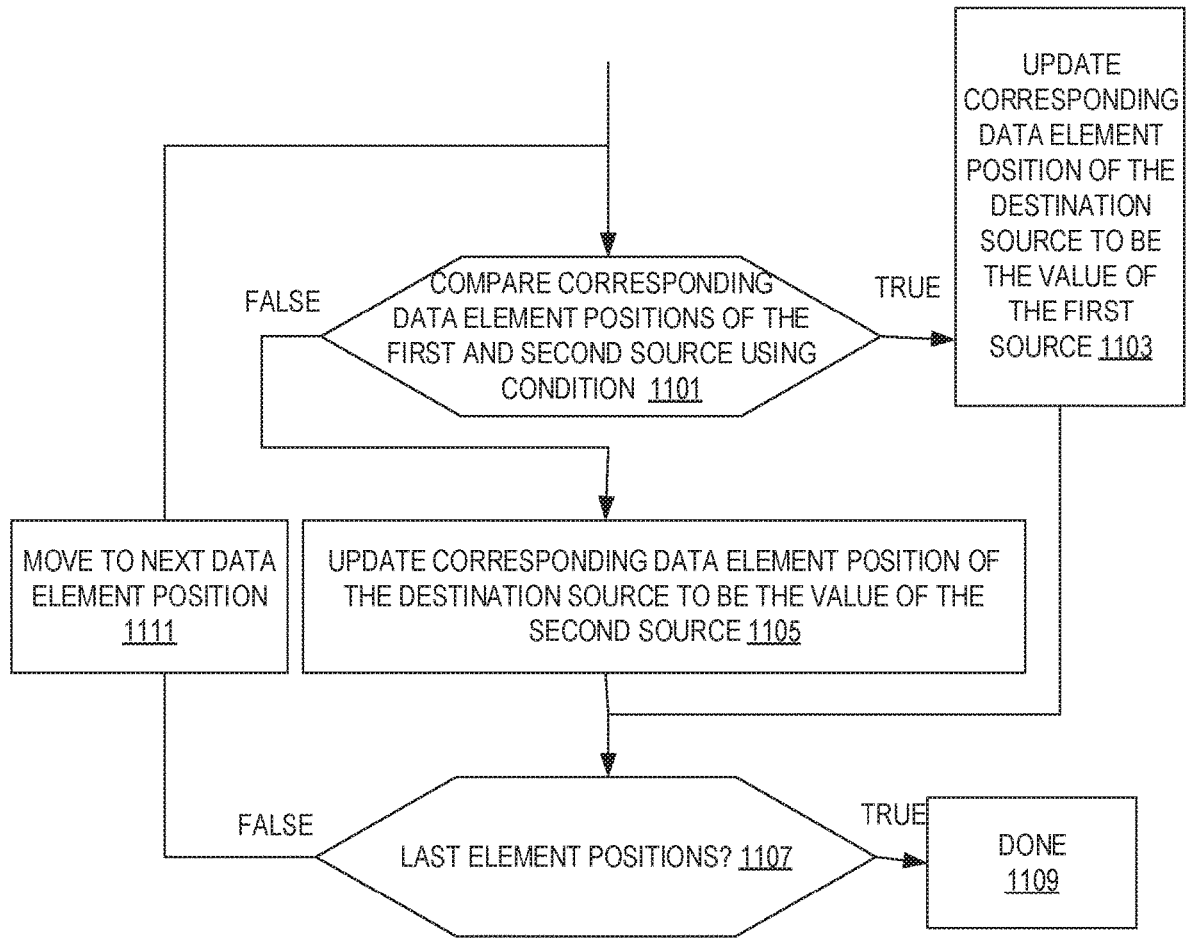
FIG. 11 illustrates an embodiment of an execution portion of execution a min and index or max and mask instruction.

FIG. 11 illustrates an embodiment of an execution portion of execution a min and index or max and mask instruction.

At 1101, a comparison is made between data elements of corresponding data element positions of the first and second sources. The condition is either to determine a maximum or a minimum depending on the instruction. When the condition is true, such that the element from the first source is the minimum (for a minimum comparison) or a maximum (for a maximum comparison), then the corresponding data element position of the destination is set to be the value of the first source at that position at 1103.

When the condition is false, such that the element from the second source is the minimum (for a minimum comparison) or a maximum (for a maximum comparison), then the destination at that position is changed to be the value from the second source at 1105.

A determination of if the compared element positions were the last to evaluation is made at 1107. When all element positions of the first and second sources have been evaluated then the execution is done at 1109. When all element positions of the first and second sources have not been evaluated then the process moves to the next data element position at 1111 and the elements of those data element positions are compared at 1101.

Detailed herein are examples of hardware, software, etc. to execute the above described instructions. For example, what is described below details aspects of instruction execution including various pipeline stages such as fetch, decode, schedule, execute, retire, etc.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an instruction set architecture (ISA) is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 12A:
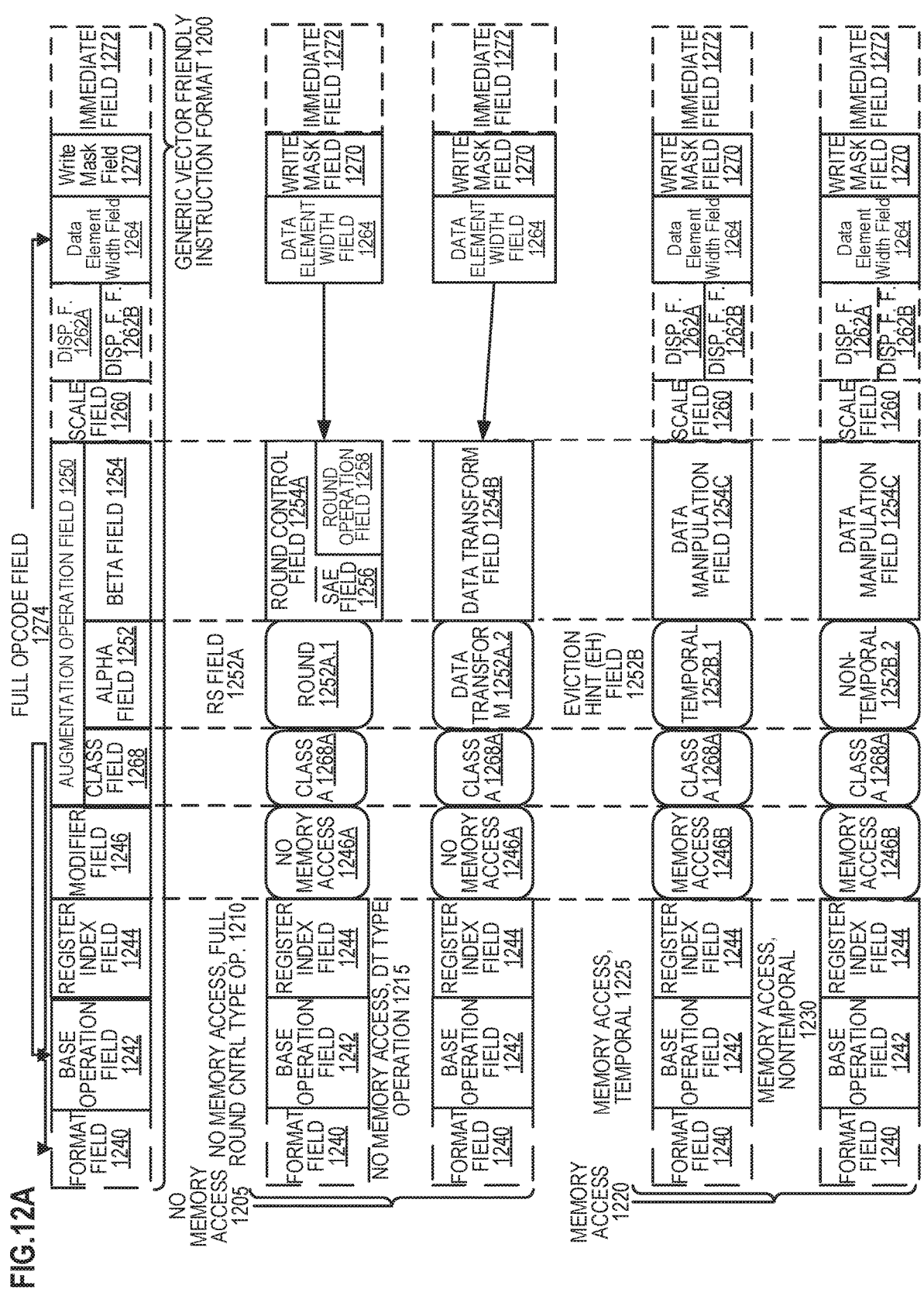
FIGS. 12A-B are block diagrams illustrating a generic vector friendly instruction format and instruction templates thereof according to embodiments of the invention.
Figure 12B:
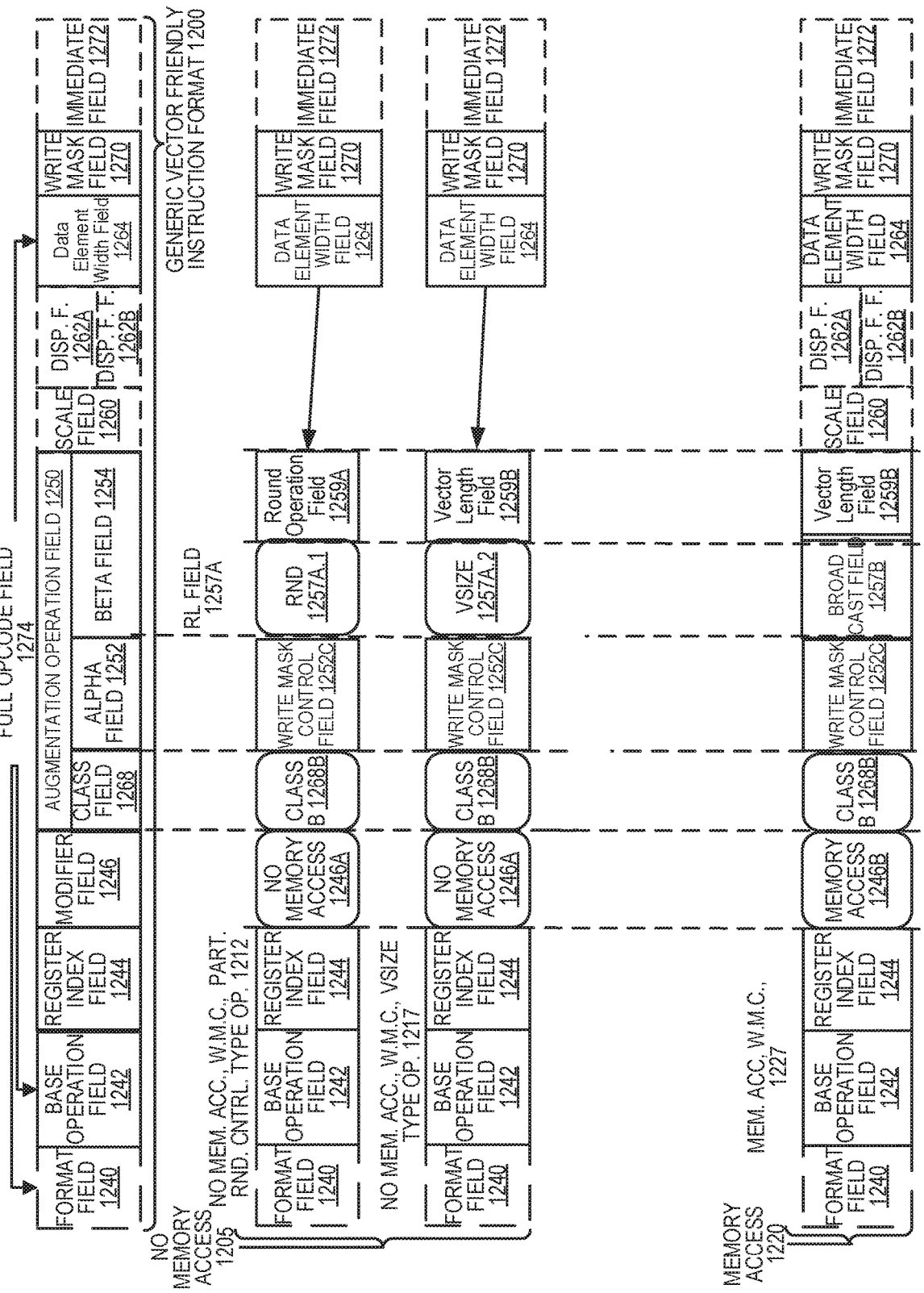

FIGS. 12A-12B are block diagrams illustrating a generic vector friendly instruction format and instruction templates thereof according to embodiments of the invention. FIG. 12A is a block diagram illustrating a generic vector friendly instruction format and class A instruction templates thereof according to embodiments of the invention; while FIG. 12B is a block diagram illustrating the generic vector friendly instruction format and class B instruction templates thereof according to embodiments of the invention. Specifically, a generic vector friendly instruction format 1200 for which are defined class A and class B instruction templates, both of which include no memory access 1205 instruction templates and memory access 1220 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 12A include: 1) within the no memory access 1205 instruction templates there is shown a no memory access, full round control type operation 1210 instruction template and a no memory access, data transform type operation 1215 instruction template; and 2) within the memory access 1220 instruction templates there is shown a memory access, temporal 1225 instruction template and a memory access, non-temporal 1230 instruction template. The class B instruction templates in FIG. 12B include: 1) within the no memory access 1205 instruction templates there is shown a no memory access, write mask control, partial round control type operation 1212 instruction template and a no memory access, write mask control, vsize type operation 1217 instruction template; and 2) within the memory access 1220 instruction templates there is shown a memory access, write mask control 1227 instruction template.

The generic vector friendly instruction format 1200 includes the following fields listed below in the order illustrated in FIGS. 12A-12B.

Format field 1240—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1242—its content distinguishes different base operations.

Register index field 1244—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1246—its content distinguishes occurrences of instructions in the generic vector instruction format that specify memory access from those that do not; that is, between no memory access 1205 instruction templates and memory access 1220 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1250—its content distinguishes which one of a variety of different operations to be performed in addition to the base operation. This field is context specific. In one embodiment of the invention, this field is divided into a class field 1268, an alpha field 1252, and a beta field 1254. The augmentation operation field 1250 allows common groups of operations to be performed in a single instruction rather than 2, 3, or 4 instructions.

Scale field 1260—its content allows for the scaling of the index field's content for memory address generation (e.g., for address generation that uses $2^{scale}$*index+base).

Displacement Field 1262A—its content is used as part of memory address generation (e.g., for address generation that uses $2^{scale}$*index+base+displacement).

Displacement Factor Field 1262B (note that the juxtaposition of displacement field 1262A directly over displacement factor field 1262B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1274 (described later herein) and the data manipulation field 1254C. The displacement field 1262A and the displacement factor field 1262B are optional in the sense that they are not used for the no memory access 1205 instruction templates and/or different embodiments may implement only one or none of the two.

Data element width field 1264—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1270—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1270 allows for partial vector operations, including loads, stores, arithmetic, logical, etc. While embodiments of the invention are described in which the write mask field's 1270 content selects one of a number of write mask registers that contains the write mask to be used (and thus the write mask field's 1270 content indirectly identifies that masking to be performed), alternative embodiments instead or additional allow the mask write field's 1270 content to directly specify the masking to be performed.

Immediate field 1272—its content allows for the specification of an immediate. This field is optional in the sense that is it not present in an implementation of the generic vector friendly format that does not support immediate and it is not present in instructions that do not use an immediate.

Class field 1268—its content distinguishes between different classes of instructions. With reference to FIGS. 12A-B, the contents of this field select between class A and class B instructions. In FIGS. 12A-B, rounded corner squares are used to indicate a specific value is present in a field (e.g., class A 1268A and class B 1268B for the class field 1268 respectively in FIGS. 12A-B).

Instruction Templates of Class A

In the case of the non-memory access 1205 instruction templates of class A, the alpha field 1252 is interpreted as an RS field 1252A, whose content distinguishes which one of the different augmentation operation types are to be performed (e.g., round 1252A.1 and data transform 1252A.2 are respectively specified for the no memory access, round type operation 1210 and the no memory access, data transform type operation 1215 instruction templates), while the beta field 1254 distinguishes which of the operations of the specified type is to be performed. In the no memory access 1205 instruction templates, the scale field 1260, the displacement field 1262A, and the displacement scale filed 1262B are not present.

No-Memory Access Instruction Templates—Full Round Control Type Operation

In the no memory access full round control type operation 1210 instruction template, the beta field 1254 is interpreted as a round control field 1254A, whose content(s) provide static rounding. While in the described embodiments of the invention the round control field 1254A includes a suppress all floating point exceptions (SAE) field 1256 and a round operation control field 1258, alternative embodiments may support may encode both these concepts into the same field or only have one or the other of these concepts/fields (e.g., may have only the round operation control field 1258).

SAE field 1256—its content distinguishes whether or not to disable the exception event reporting; when the SAE field's 1256 content indicates suppression is enabled, a given instruction does not report any kind of floating-point exception flag and does not raise any floating point exception handler.

Round operation control field 1258—its content distinguishes which one of a group of rounding operations to perform (e.g., Round-up, Round-down, Round-towards-zero and Round-to-nearest). Thus, the round operation control field 1258 allows for the changing of the rounding mode on a per instruction basis. In one embodiment of the invention where a processor includes a control register for specifying rounding modes, the round operation control field's 1250 content overrides that register value.

No Memory Access Instruction Templates—Data Transform Type Operation

In the no memory access data transform type operation 1215 instruction template, the beta field 1254 is interpreted as a data transform field 1254B, whose content distinguishes which one of a number of data transforms is to be performed (e.g., no data transform, swizzle, broadcast).

In the case of a memory access 1220 instruction template of class A, the alpha field 1252 is interpreted as an eviction hint field 1252B, whose content distinguishes which one of the eviction hints is to be used (in FIG. 12A, temporal 1252B.1 and non-temporal 1252B.2 are respectively specified for the memory access, temporal 1225 instruction template and the memory access, non-temporal 1230 instruction template), while the beta field 1254 is interpreted as a data manipulation field 1254C, whose content distinguishes which one of a number of data manipulation operations (also known as primitives) is to be performed (e.g., no manipulation; broadcast; up conversion of a source; and down conversion of a destination). The memory access 1220 instruction templates include the scale field 1260, and optionally the displacement field 1262A or the displacement scale field 1262B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1252 is interpreted as a write mask control (Z) field 1252C, whose content distinguishes whether the write masking controlled by the write mask field 1270 should be a merging or a zeroing.

In the case of the non-memory access 1205 instruction templates of class B, part of the beta field 1254 is interpreted as an RL field 1257A, whose content distinguishes which one of the different augmentation operation types are to be performed (e.g., round 1257A.1 and vector length (VSIZE) 1257A.2 are respectively specified for the no memory access, write mask control, partial round control type operation 1212 instruction template and the no memory access, write mask control, VSIZE type operation 1217 instruction template), while the rest of the beta field 1254 distinguishes which of the operations of the specified type is to be performed. In the no memory access 1205 instruction templates, the scale field 1260, the displacement field 1262A, and the displacement scale filed 1262B are not present.

In the no memory access, write mask control, partial round control type operation 1210 instruction template, the rest of the beta field 1254 is interpreted as a round operation field 1259A and exception event reporting is disabled (a given instruction does not report any kind of floating-point exception flag and does not raise any floating point exception handler).

Round operation control field 1259A—just as round operation control field 1258, its content distinguishes which one of a group of rounding operations to perform (e.g., Round-up, Round-down, Round-towards-zero and Round-to-nearest). Thus, the round operation control field 1259A allows for the changing of the rounding mode on a per instruction basis. In one embodiment of the invention where a processor includes a control register for specifying rounding modes, the round operation control field's 1250 content overrides that register value.

In the no memory access, write mask control, VSIZE type operation 1217 instruction template, the rest of the beta field 1254 is interpreted as a vector length field 1259B, whose content distinguishes which one of a number of data vector lengths is to be performed on (e.g., 128, 256, or 512 byte).

In the case of a memory access 1220 instruction template of class B, part of the beta field 1254 is interpreted as a broadcast field 1257B, whose content distinguishes whether or not the broadcast type data manipulation operation is to be performed, while the rest of the beta field 1254 is interpreted the vector length field 1259B. The memory access 1220 instruction templates include the scale field 1260, and optionally the displacement field 1262A or the displacement scale field 1262B.

With regard to the generic vector friendly instruction format 1200, a full opcode field 1274 is shown including the format field 1240, the base operation field 1242, and the data element width field 1264. While one embodiment is shown where the full opcode field 1274 includes all of these fields, the full opcode field 1274 includes less than all of these fields in embodiments that do not support all of them. The full opcode field 1274 provides the operation code (opcode).

The augmentation operation field 1250, the data element width field 1264, and the write mask field 1270 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 13A is a block diagram illustrating an exemplary specific vector friendly instruction format according to embodiments of the invention. FIG. 13A shows a specific vector friendly instruction format 1300 that is specific in the sense that it specifies the location, size, interpretation, and order of the fields, as well as values for some of those fields. The specific vector friendly instruction format 1300 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 12 into which the fields from FIG. 13A map are illustrated.

It should be understood that, although embodiments of the invention are described with reference to the specific vector friendly instruction format 1300 in the context of the generic vector friendly instruction format 1200 for illustrative purposes, the invention is not limited to the specific vector friendly instruction format 1300 except where claimed. For example, the generic vector friendly instruction format 1200 contemplates a variety of possible sizes for the various fields, while the specific vector friendly instruction format 1300 is shown as having fields of specific sizes. By way of specific example, while the data element width field 1264 is illustrated as a one bit field in the specific vector friendly instruction format 1300, the invention is not so limited (that is, the generic vector friendly instruction format 1200 contemplates other sizes of the data element width field 1264).

The generic vector friendly instruction format 1200 includes the following fields listed below in the order illustrated in FIG. 13A.

EVEX Prefix (Bytes 0-3) 1302—is encoded in a four-byte form.

Format Field 1240 (EVEX Byte 0, bits [7:0])—the first byte (EVEX Byte 0) is the format field 1240 and it contains 0x62 (the unique value used for distinguishing the vector friendly instruction format in one embodiment of the invention).

The second-fourth bytes (EVEX Bytes 1-3) include a number of bit fields providing specific capability.

REX field 1305 (EVEX Byte 1, bits [7-5])—consists of a EVEX.R bit field (EVEX Byte 1, bit [7]—R), EVEX.X bit field (EVEX byte 1, bit [6]—X), and 1257BEX byte 1, bit[5]—B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1210—this is the first part of the REX' field 1210 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1315 (EVEX byte 1, bits [3:0]—mmmm)—its content encodes an implied leading opcode byte (0F, 0F 38, or 0F 3).

Data element width field 1264 (EVEX byte 2, bit [7]—W)—is represented by the notation EVEX.W. EVEX.W is used to define the granularity (size) of the datatype (either 32-bit data elements or 64-bit data elements).

EVEX.vvvv 1320 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1320 encodes the 4 low-order bits of the first source register specifier stored in inverted (1s complement) form. Depending on the instruction, an extra different EVEX bit field is used to extend the specifier size to 32 registers.

EVEX.U 1268 Class field (EVEX byte 2, bit [2]-U)—If EVEX.U=0, it indicates class A or EVEX.U0; if EVEX.U=1, it indicates class B or EVEX.U1.

Prefix encoding field 1325 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1252 (EVEX byte 3, bit [7]—EH; also known as EVEX.EH, EVEX.rs, EVEX.RL, EVEX.write mask control, and EVEX.N; also illustrated with a)—as previously described, this field is context specific.

Beta field 1254 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1210—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1270 (EVEX byte 3, bits [2:0]-kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1330 (Byte 4) is also known as the opcode byte. Part of the opcode is specified in this field.

MOD R/M Field 1340 (Byte 5) includes MOD field 1342, Reg field 1344, and R/M field 1346. As previously described, the MOD field's 1342 content distinguishes between memory access and non-memory access operations. The role of Reg field 1344 can be summarized to two situations: encoding either the destination register operand or a source register operand, or be treated as an opcode extension and not used to encode any instruction operand. The role of R/M field 1346 may include the following: encoding the instruction operand that references a memory address, or encoding either the destination register operand or a source register operand.

Scale, Index, Base (SIB) Byte (Byte 6)—As previously described, the scale field's 1250 content is used for memory address generation. SIB.xxx 1354 and SIB.bbb 1356—the contents of these fields have been previously referred to with regard to the register indexes Xxxx and Bbbb.

Displacement field 1262A (Bytes 7-10)—when MOD field 1342 contains 10, bytes 7-10 are the displacement field 1262A, and it works the same as the legacy 32-bit displacement (disp32) and works at byte granularity.

Displacement factor field 1262B (Byte 7)—when MOD field 1342 contains 01, byte 7 is the displacement factor field 1262B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1262B is a reinterpretation of disp8; when using displacement factor field 1262B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1262B substitutes the legacy x86 instruction set 8-bit displacement. Thus, the displacement factor field 1262B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1272 operates as previously described.

Full Opcode Field

FIG. 13B is a block diagram illustrating the fields of the specific vector friendly instruction format 1300 that make up the full opcode field 1274 according to one embodiment of the invention. Specifically, the full opcode field 1274 includes the format field 1240, the base operation field 1242, and the data element width (W) field 1264. The base operation field 1242 includes the prefix encoding field 1325, the opcode map field 1315, and the real opcode field 1330.

Register Index Field

FIG. 13C is a block diagram illustrating the fields of the specific vector friendly instruction format 1300 that make up the register index field 1244 according to one embodiment of the invention. Specifically, the register index field 1244 includes the REX field 1305, the REX' field 1310, the MODR/M.reg field 1344, the MODR/M.r/m field 1346, the VVVV field 1320, xxx field 1354, and the bbb field 1356.

Augmentation Operation Field

Figure 13D:
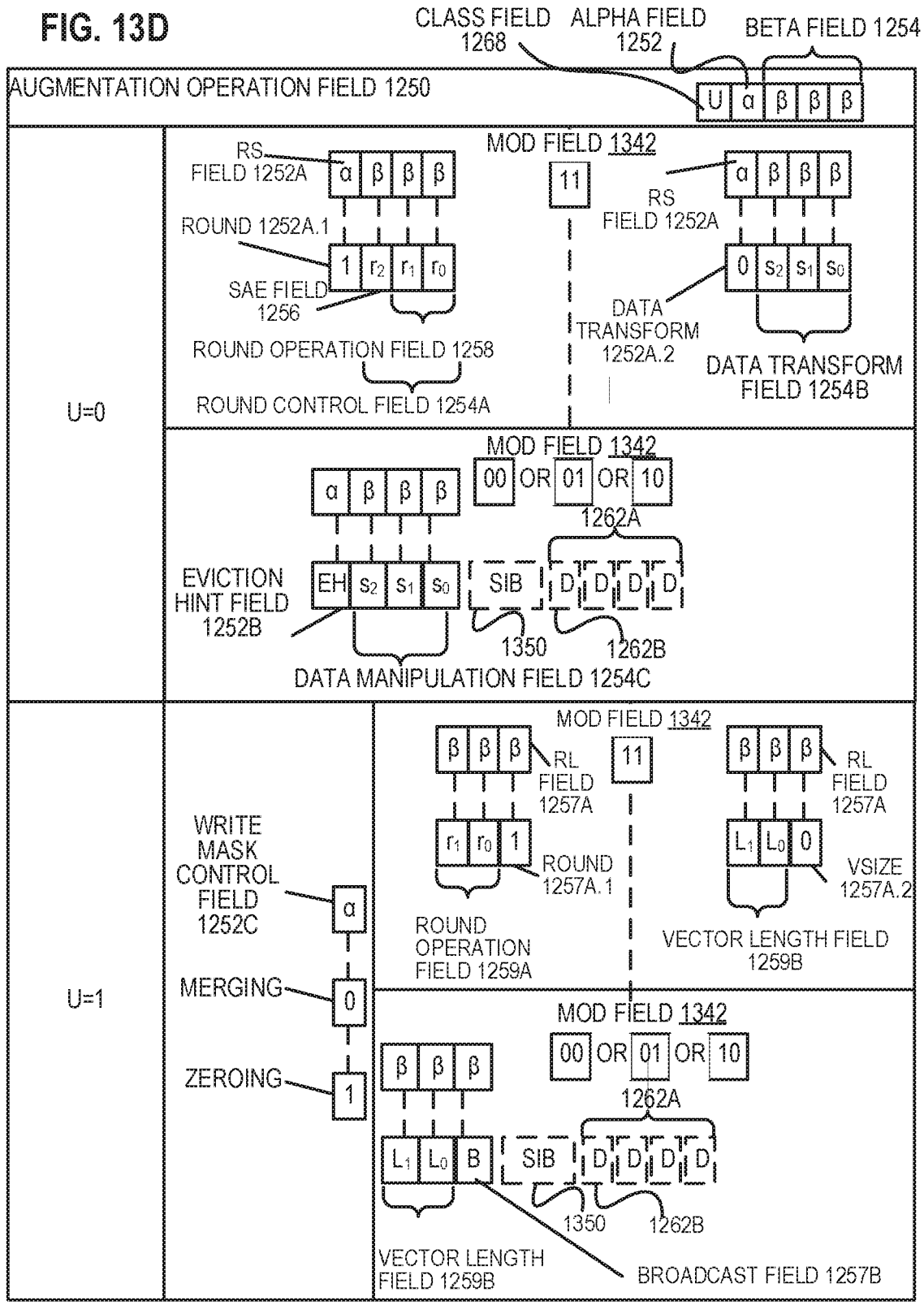

FIG. 13D is a block diagram illustrating the fields of the specific vector friendly instruction format 1300 that make up the augmentation operation field 1250 according to one embodiment of the invention. When the class (U) field 1268 contains 0, it signifies EVEX.U0 (class A 1268A); when it contains 1, it signifies EVEX.U1 (class B 1268B). When U=0 and the MOD field 1342 contains 11 (signifying a no memory access operation), the alpha field 1252 (EVEX byte 3, bit [7]—EH) is interpreted as the rs field 1252A. When the rs field 1252A contains a 1 (round 1252A.1), the beta field 1254 (EVEX byte 3, bits [6:4]—SSS) is interpreted as the round control field 1254A. The round control field 1254A includes a one bit SAE field 1256 and a two bit round operation field 1258. When the rs field 1252A contains a 0 (data transform 1252A.2), the beta field 1254 (EVEX byte 3, bits [6:4]—SSS) is interpreted as a three bit data transform field 1254B. When U=0 and the MOD field 1342 contains 00, 01, or 10 (signifying a memory access operation), the alpha field 1252 (EVEX byte 3, bit [7]—EH) is interpreted as the eviction hint (EH) field 1252B and the beta field 1254 (EVEX byte 3, bits [6:4]—SSS) is interpreted as a three bit data manipulation field 1254C.

When U=1, the alpha field 1252 (EVEX byte 3, bit [7]—EH) is interpreted as the write mask control (Z) field 1252C. When U=1 and the MOD field 1342 contains 11 (signifying a no memory access operation), part of the beta field 1254 (EVEX byte 3, bit [4]-$S_0$) is interpreted as the RL field 1257A; when it contains a 1 (round 1257A.1) the rest of the beta field 1254 (EVEX byte 3, bit [6-5]—$S_{2-1}$) is interpreted as the round operation field 1259A, while when the RL field 1257A contains a 0 (VSIZE 1257.A2) the rest of the beta field 1254 (EVEX byte 3, bit [6-5]—$S_{2-1}$) is interpreted as the vector length field 1259B (EVEX byte 3, bit [6-5]—$L_{1-0}$). When U=1 and the MOD field 1342 contains 00, 01, or 10 (signifying a memory access operation), the beta field 1254 (EVEX byte 3, bits [6:4]—SSS) is interpreted as the vector length field 1259B (EVEX byte 3, bit [6-5]—$L_{1-0}$) and the broadcast field 1257B (EVEX byte 3, bit [4]—B).

Exemplary Register Architecture

FIG. 14 is a block diagram of a register architecture 1400 according to one embodiment of the invention. In the embodiment illustrated, there are 32 vector registers 1410 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1300 operates on these overlaid register file as illustrated in the below tables.

| Adjustable Vector Length | Class | Operations | Registers |
| --- | --- | --- | --- |
| Instruction Templates that do not include the vector length field | A (FIG. 12A; U = 0) | 1210, 1215, 1225, 1230 | zmm registers (the vector length is 64 byte) |

-continued

| Adjustable Vector Length | Class | Operations | Registers |
|---|---|---|---|
| 1259B | B (FIG. 12B; U = 1) | 1212 | zmm registers (the vector length is 64 byte) |
| Instruction templates that do include the vector length field 1259B | B (FIG. 12B; U = 1) | 1217, 1227 | zmm, ymm, or xmm registers (the vector length is 64 byte, 32 byte, or 16 byte) depending on the vector length field 1259B |

In other words, the vector length field 1259B selects between a maximum length and one or more other shorter lengths, where each such shorter length is half the length of the preceding length; and instructions templates without the vector length field 1259B operate on the maximum vector length. Further, in one embodiment, the class B instruction templates of the specific vector friendly instruction format 1300 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1415—in the embodiment illustrated, there are 8 write mask registers (k0 through k7), each 64 bits in size. In an alternate embodiment, the write mask registers 1415 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1425—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1445, on which is aliased the MMX packed integer flat register file 1450—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-Of-Order Core Block Diagram

FIG. 15A is a block diagram illustrating both an exemplary in-order pipeline and an exemplary register renaming, out-of-order issue/execution pipeline according to embodiments of the invention. FIG. 15B is a block diagram illustrating both an exemplary embodiment of an in-order architecture core and an exemplary register renaming, out-of-order issue/execution architecture core to be included in a processor according to embodiments of the invention. The solid lined boxes in FIGS. 15A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 15A, a processor pipeline 1500 includes a fetch stage 1502, a length decode stage 1504, a decode stage 1506, an allocation stage 1508, a renaming stage 1510, a scheduling (also known as a dispatch or issue) stage 1512, a register read/memory read stage 1514, an execute stage 1516, a write back/memory write stage 1518, an exception handling stage 1522, and a commit stage 1524.

FIG. 15B shows processor core 1590 including a front end unit 1530 coupled to an execution engine unit 1550, and both are coupled to a memory unit 1570. The core 1590 may be a reduced instruction set computing (RISC) core, a complex instruction set computing (CISC) core, a very long instruction word (VLIW) core, or a hybrid or alternative core type. As yet another option, the core 1590 may be a special-purpose core, such as, for example, a network or communication core, compression engine, coprocessor core, general purpose computing graphics processing unit (GPGPU) core, graphics core, or the like.

The front end unit 1530 includes a branch prediction unit 1532 coupled to an instruction cache unit 1534, which is coupled to an instruction translation lookaside buffer (TLB) 1536, which is coupled to an instruction fetch unit 1538, which is coupled to a decode unit 1540. The decode unit 1540 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1540 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1590 includes a microcode ROM or other medium that stores microcode for certain macroinstructions (e.g., in decode unit 1540 or otherwise within the front end unit 1530). The decode unit 1540 is coupled to a rename/allocator unit 1552 in the execution engine unit 1550.

The execution engine unit 1550 includes the rename/allocator unit 1552 coupled to a retirement unit 1554 and a set of one or more scheduler unit(s) 1556. The scheduler unit(s) 1556 represents any number of different schedulers, including reservations stations, central instruction window, etc. The scheduler unit(s) 1556 is coupled to the physical register file(s) unit(s) 1558. Each of the physical register file(s) units 1558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1558 comprises a vector registers unit, a write mask registers unit, and a scalar registers unit. These register units may provide architectural vector registers, vector mask registers, and general purpose registers. The physical register file(s) unit(s) 1558 is overlapped by the retirement unit 1554 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1554 and the physical register file(s) unit(s) 1558 are coupled to the execution cluster(s) 1560. The execution cluster(s) 1560 includes a set of one or more execution units 1562 and a set of one or more memory access units 1564. The execution units 1562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1556, physical register file(s) unit(s) 1558, and execution cluster(s) 1560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1564). It should also be understood that where separate pipelines are used, one or more of these pipelines may be out-of-order issue/execution and the rest in-order.

The set of memory access units 1564 is coupled to the memory unit 1570, which includes a data TLB unit 1572 coupled to a data cache unit 1574 coupled to a level 2 (L2) cache unit 1576. In one exemplary embodiment, the memory access units 1564 may include a load unit, a store address unit, and a store data unit, each of which is coupled to the data TLB unit 1572 in the memory unit 1570. The instruction cache unit 1534 is further coupled to a level 2 (L2) cache unit 1576 in the memory unit 1570. The L2 cache unit 1576 is coupled to one or more other levels of cache and eventually to a main memory.

By way of example, the exemplary register renaming, out-of-order issue/execution core architecture may implement the pipeline 1500 as follows: 1) the instruction fetch 1538 performs the fetch and length decoding stages 1502 and 1504; 2) the decode unit 1540 performs the decode stage 1506; 3) the rename/allocator unit 1552 performs the allocation stage 1508 and renaming stage 1510; 4) the scheduler unit(s) 1556 performs the schedule stage 1512; 5) the physical register file(s) unit(s) 1558 and the memory unit 1570 perform the register read/memory read stage 1514; the execution cluster 1560 perform the execute stage 1516; 6) the memory unit 1570 and the physical register file(s) unit(s) 1558 perform the write back/memory write stage 1518; 7) various units may be involved in the exception handling stage 1522; and 8) the retirement unit 1554 and the physical register file(s) unit(s) 1558 perform the commit stage 1524.

The core 1590 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1590 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1534/1574 and a shared L2 cache unit 1576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 16B:
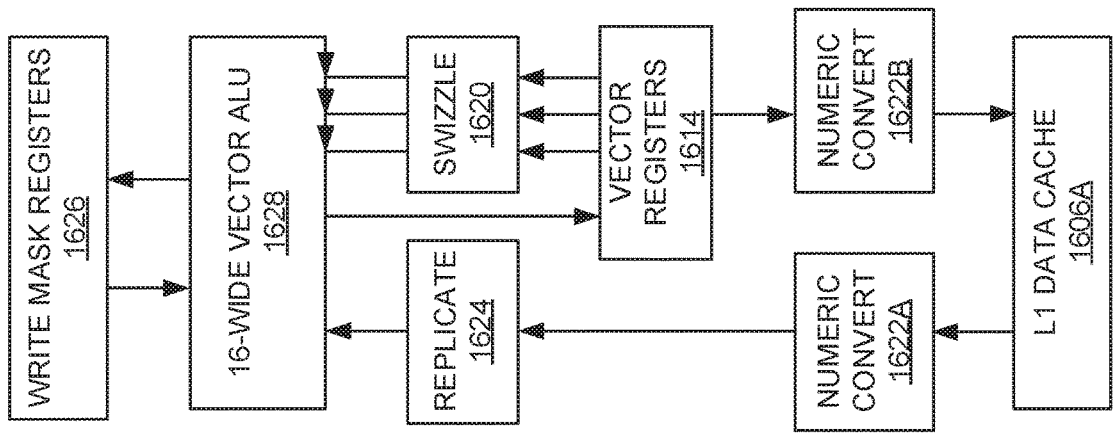
FIGS. 16A-B illustrate a block diagram of a more specific exemplary in-order core architecture, which core would be one of several logic blocks (including other cores of the same type and/or different types) in a chip.
Figure 16A:
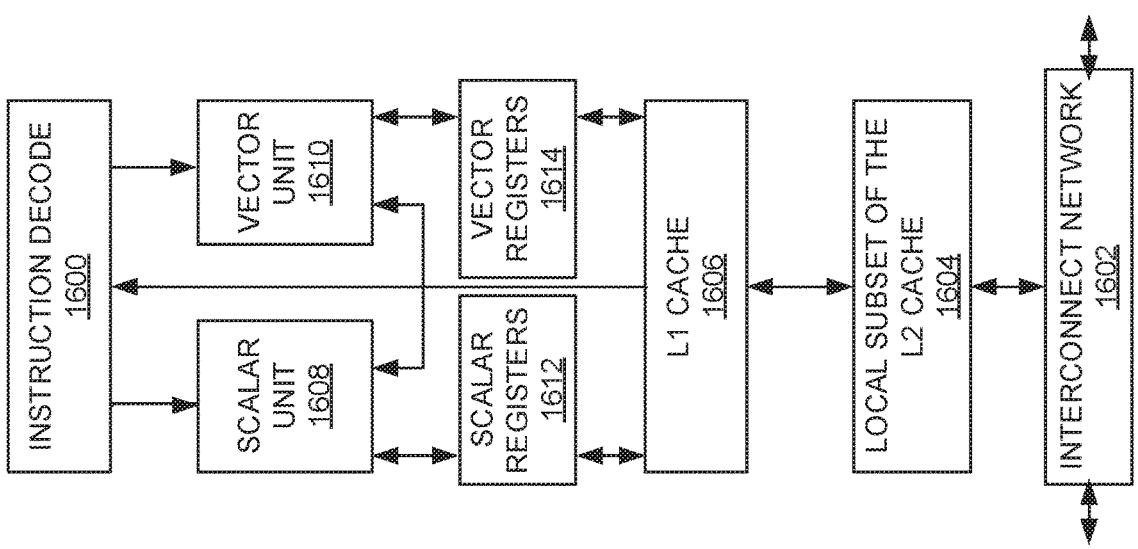

FIGS. 16A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 16A is a block diagram of a single processor core, along with its connection to the on-die interconnect network 1602 and with its local subset of the Level 2 (L2) cache 1604, according to embodiments of the invention. In one embodiment, an instruction decoder 1600 supports the x86 instruction set with a packed data instruction set extension. An L1 cache 1606 allows low-latency accesses to cache memory into the scalar and vector units. While in one embodiment (to simplify the design), a scalar unit 1608 and a vector unit 1610 use separate register sets (respectively, scalar registers 1612 and vector registers 1614) and data transferred between them is written to memory and then read back in from a level 1 (L1) cache 1606, alternative embodiments of the invention may use a different approach (e.g., use a single register set or include a communication path that allow data to be transferred between the two register files without being written and read back).

The local subset of the L2 cache 1604 is part of a global L2 cache that is divided into separate local subsets, one per processor core. Each processor core has a direct access path to its own local subset of the L2 cache 1604. Data read by a processor core is stored in its L2 cache subset 1604 and can be accessed quickly, in parallel with other processor cores accessing their own local L2 cache subsets. Data written by a processor core is stored in its own L2 cache subset 1604 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 16B is an expanded view of part of the processor core in FIG. 16A according to embodiments of the invention. FIG. 16B includes an L1 data cache 1606A part of the L1 cache 1604, as well as more detail regarding the vector unit 1610 and the vector registers 1614. Specifically, the vector unit 1610 is a 16-wide vector processing unit (VPU) (see the 16-wide ALU 1628), which executes one or more of integer, single-precision float, and double-precision float instructions. The VPU supports swizzling the register inputs with swizzle unit 1620, numeric conversion with numeric convert units 1622A-B, and replication with replication unit 1624 on the memory input. Write mask registers 1626 allow predicating resulting vector writes.

Figure 17:
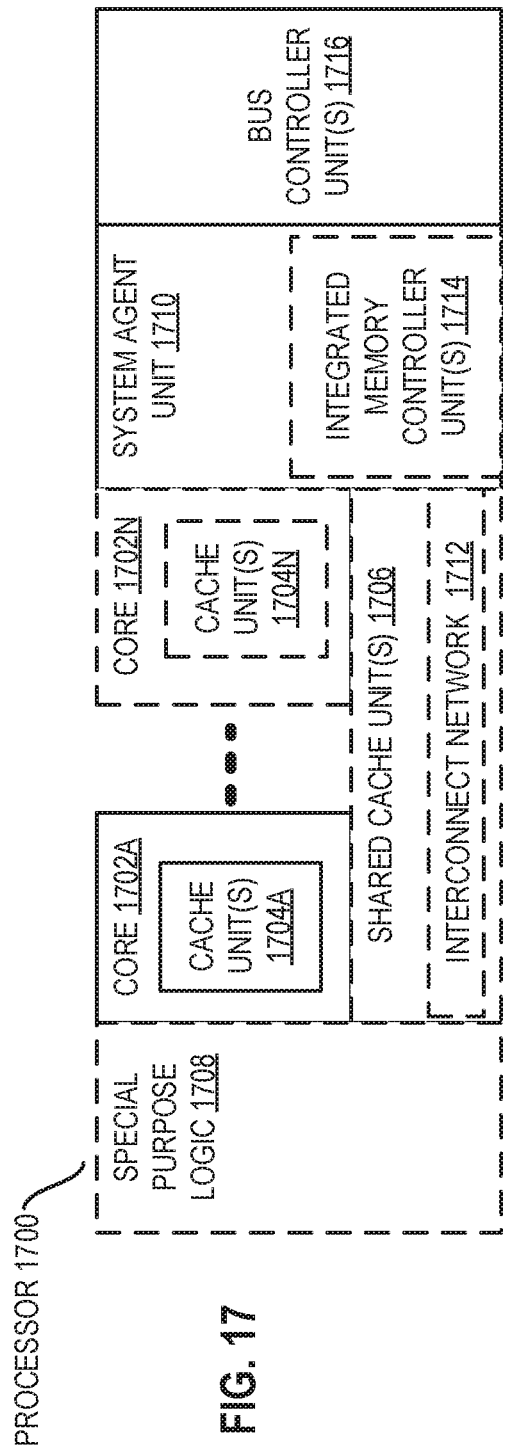
FIG. 17 is a block diagram of a processor 1700 that may have more than one core, may have an integrated memory controller, and may have integrated graphics according to embodiments of the invention.

FIG. 17 is a block diagram of a processor 1700 that may have more than one core, may have an integrated memory controller, and may have integrated graphics according to embodiments of the invention. The solid lined boxes in FIG. 17 illustrate a processor 1700 with a single core 1702A, a system agent 1710, a set of one or more bus controller units 1716, while the optional addition of the dashed lined boxes illustrates an alternative processor 1700 with multiple cores 1702A-N, a set of one or more integrated memory controller unit(s) 1714 in the system agent unit 1710, and special purpose logic 1708.

Thus, different implementations of the processor 1700 may include: 1) a CPU with the special purpose logic 1708 being integrated graphics and/or scientific (throughput) logic (which may include one or more cores), and the cores 1702A-N being one or more general purpose cores (e.g., general purpose in-order cores, general purpose out-of-order cores, a combination of the two); 2) a coprocessor with the cores 1702A-N being a large number of special purpose cores intended primarily for graphics and/or scientific (throughput); and 3) a coprocessor with the cores 1702A-N being a large number of general purpose in-order cores. Thus, the processor 1700 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1700 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1706, and external memory (not shown) coupled to the set of integrated memory controller units 1714. The set of shared cache units 1706 may include one or more mid-level caches, such as level 2 (L2), level 3 (L3), level 4 (L4), or other levels of cache, a last level cache (LLC), and/or combinations thereof. While in one embodiment a ring based interconnect unit 1712 interconnects the integrated graphics logic 1708 (integrated graphics logic 1708 is an example of and is also referred to herein as special purpose logic), the set of shared cache units 1706, and the system agent unit 1710/integrated memory controller unit(s) 1714, alternative embodiments may use any number of well-known techniques for interconnecting such units. In one embodiment, coherency is maintained between one or more cache units 1706 and cores 1702-A-N.

In some embodiments, one or more of the cores 1702A-N are capable of multi-threading. The system agent 1710 includes those components coordinating and operating cores 1702A-N. The system agent unit 1710 may include for example a power control unit (PCU) and a display unit. The PCU may be or include logic and components needed for regulating the power state of the cores 1702A-N and the integrated graphics logic 1708. The display unit is for driving one or more externally connected displays.

The cores 1702A-N may be homogenous or heterogeneous in terms of architecture instruction set; that is, two or more of the cores 1702A-N may be capable of execution the same instruction set, while others may be capable of executing only a subset of that instruction set or a different instruction set.

Exemplary Computer Architectures

FIGS. 18-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 18:
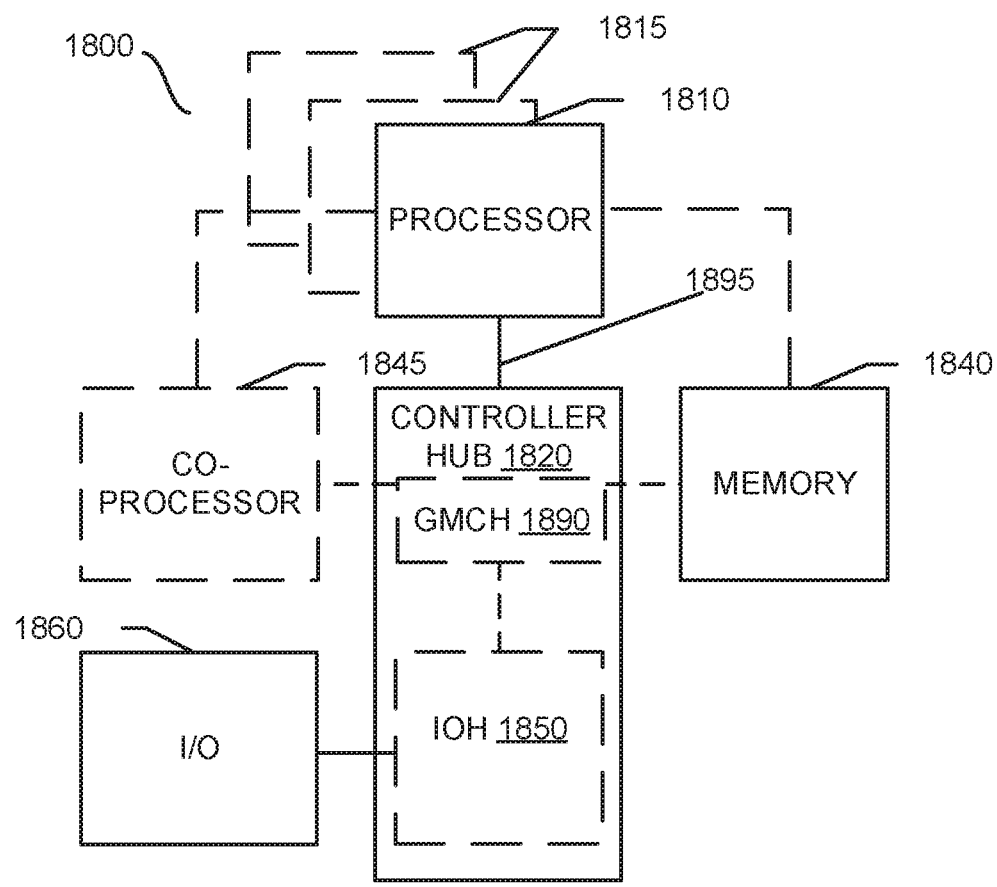
FIGS. 18-21 are block diagrams of exemplary computer architectures.

Referring now to FIG. 18, shown is a block diagram of a system 1800 in accordance with one embodiment of the present invention. The system 1800 may include one or more processors 1810, 1815, which are coupled to a controller hub 1820. In one embodiment the controller hub 1820 includes a graphics memory controller hub (GMCH) 1890 and an Input/Output Hub (IOH) 1850 (which may be on separate chips); the GMCH 1890 includes memory and graphics controllers to which are coupled memory 1840 and a coprocessor 1845; the IOH 1850 couples input/output (I/O) devices 1860 to the GMCH 1890. Alternatively, one or both of the memory and graphics controllers are integrated within the processor (as described herein), the memory 1840 and the coprocessor 1845 are coupled directly to the processor 1810, and the controller hub 1820 in a single chip with the IOH 1850.

The optional nature of additional processors 1815 is denoted in FIG. 18 with broken lines. Each processor 1810, 1815 may include one or more of the processing cores described herein and may be some version of the processor 1700.

The memory 1840 may be, for example, dynamic random access memory (DRAM), phase change memory (PCM), or a combination of the two. For at least one embodiment, the controller hub 1820 communicates with the processor(s) 1810, 1815 via a multi-drop bus, such as a frontside bus (FSB), point-to-point interface such as QuickPath Interconnect (QPI), or similar connection 1895.

In one embodiment, the coprocessor 1845 is a special-purpose processor, such as, for example, a high-throughput MIC processor, a network or communication processor, compression engine, graphics processor, GPGPU, embedded processor, or the like. In one embodiment, controller hub 1820 may include an integrated graphics accelerator.

There can be a variety of differences between the physical resources 1810, 1815 in terms of a spectrum of metrics of merit including architectural, microarchitectural, thermal, power consumption characteristics, and the like.

In one embodiment, the processor 1810 executes instructions that control data processing operations of a general type. Embedded within the instructions may be coprocessor instructions. The processor 1810 recognizes these coprocessor instructions as being of a type that should be executed by the attached coprocessor 1845. Accordingly, the processor 1810 issues these coprocessor instructions (or control signals representing coprocessor instructions) on a coprocessor bus or other interconnect, to coprocessor 1845. Coprocessor(s) 1845 accept and execute the received coprocessor instructions.

Figure 19:
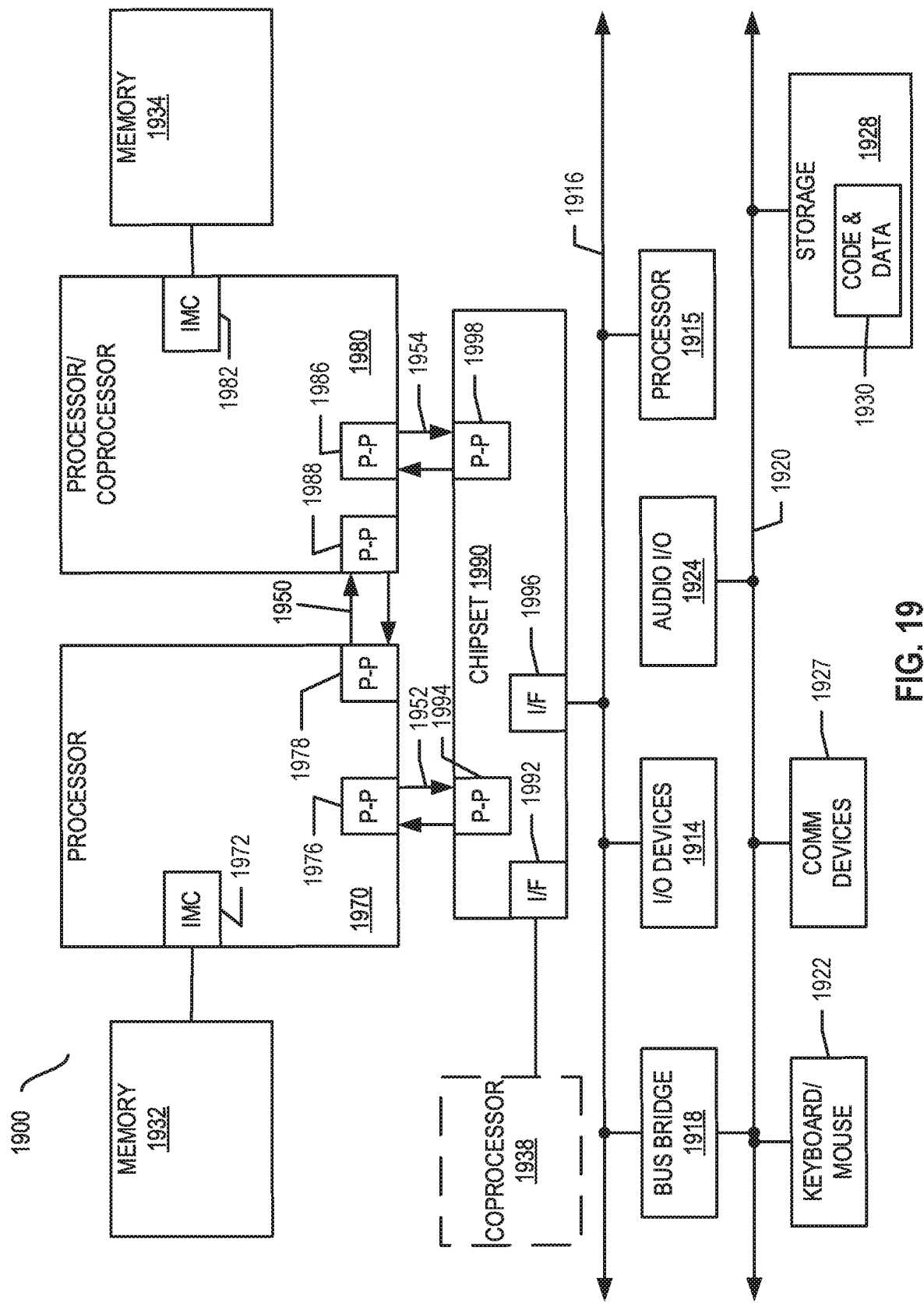

Referring now to FIG. 19, shown is a block diagram of a first more specific exemplary system 1900 in accordance with an embodiment of the present invention. As shown in FIG. 19, multiprocessor system 1900 is a point-to-point interconnect system, and includes a first processor 1970 and a second processor 1980 coupled via a point-to-point interconnect 1950. Each of processors 1970 and 1980 may be some version of the processor 1700. In one embodiment of the invention, processors 1970 and 1980 are respectively processors 1810 and 1815, while coprocessor 1938 is coprocessor 1845. In another embodiment, processors 1970 and 1980 are respectively processor 1810 coprocessor 1845.

Processors 1970 and 1980 are shown including integrated memory controller (IMC) units 1972 and 1982, respectively. Processor 1970 also includes as part of its bus controller units point-to-point (P-P) interfaces 1976 and 1978; similarly, second processor 1980 includes P-P interfaces 1986 and 1988. Processors 1970, 1980 may exchange information via a point-to-point (P-P) interface 1950 using P-P interface circuits 1978, 1988. As shown in FIG. 19, IMCs 1972 and 1982 couple the processors to respective memories, namely a memory 1932 and a memory 1934, which may be portions of main memory locally attached to the respective processors.

Processors 1970, 1980 may each exchange information with a chipset 1990 via individual P-P interfaces 1952, 1954 using point to point interface circuits 1976, 1994, 1986, 1998. Chipset 1990 may optionally exchange information with the coprocessor 1938 via a high-performance interface 1992. In one embodiment, the coprocessor 1938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1990 may be coupled to a first bus 1916 via an interface 1996. In one embodiment, first bus 1916 may be a Peripheral Component Interconnect (PCI) bus, or a bus such as a PCI Express bus or another third generation I/O interconnect bus, although the scope of the present invention is not so limited.

As shown in FIG. 19, various I/O devices 1914 may be coupled to first bus 1916, along with a bus bridge 1918 which couples first bus 1916 to a second bus 1920. In one embodiment, one or more additional processor(s) 1915, such as coprocessors, high-throughput MIC processors, GPGPU's, accelerators (such as, e.g., graphics accelerators or digital signal processing (DSP) units), field programmable gate arrays, or any other processor, are coupled to first bus 1916. In one embodiment, second bus 1920 may be a low pin count (LPC) bus. Various devices may be coupled to a second bus 1920 including, for example, a keyboard and/or mouse 1922, communication devices 1927 and a storage unit 1928 such as a disk drive or other mass storage device which may include instructions/code and data 1930, in one embodiment. Further, an audio I/O 1924 may be coupled to the second bus 1920. Note that other architectures are possible. For example, instead of the point-to-point architecture of FIG. 19, a system may implement a multi-drop bus or other such architecture.

Figure 20:
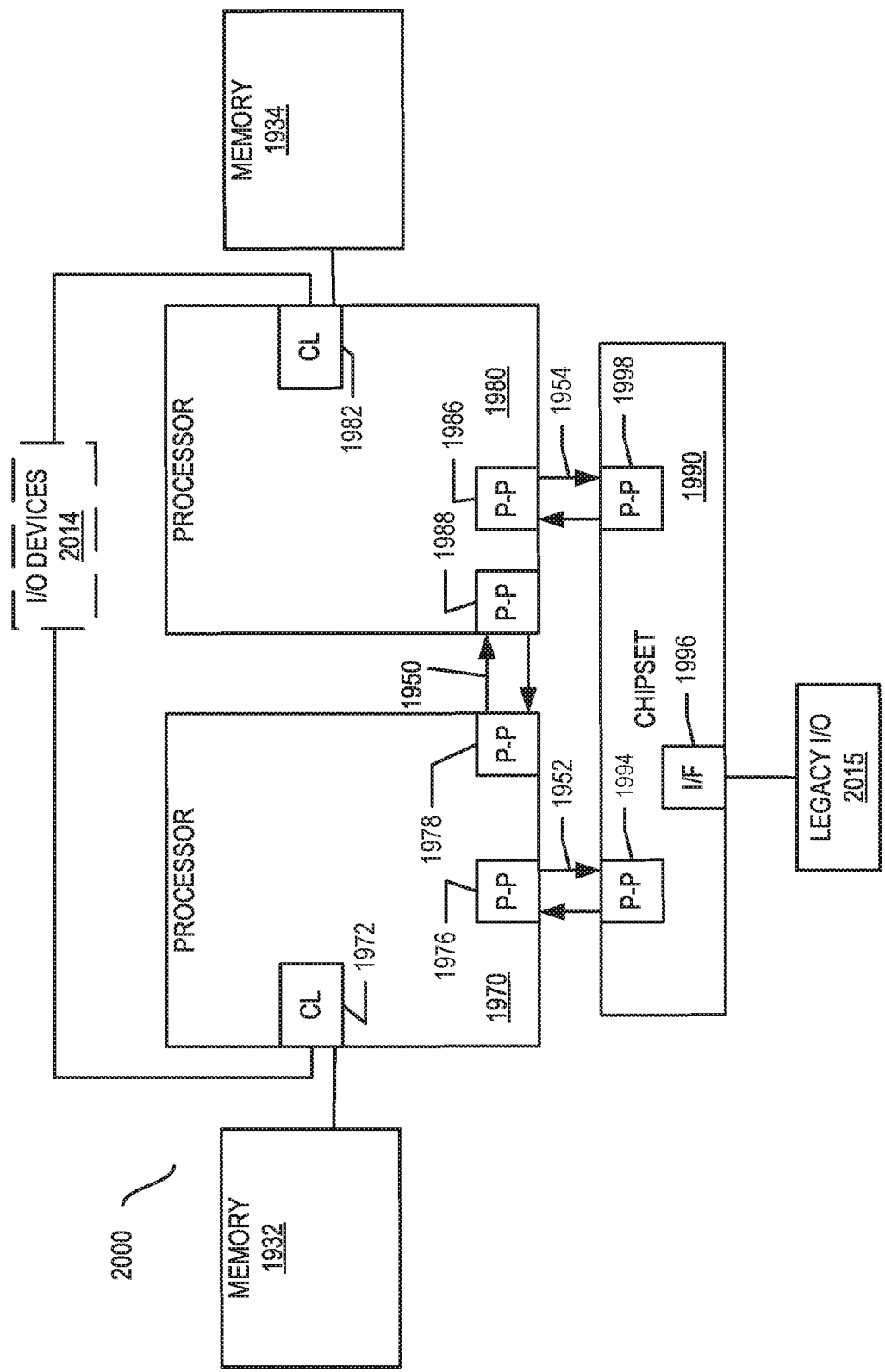

Referring now to FIG. 20, shown is a block diagram of a second more specific exemplary system 2000 in accordance with an embodiment of the present invention. Like elements in FIGS. 19 and 20 bear like reference numerals, and certain aspects of FIG. 19 have been omitted from FIG. 20 in order to avoid obscuring other aspects of FIG. 20.

FIG. 20 illustrates that the processors 1970, 1980 may include integrated memory and I/O control logic ("CL") 1972 and 1982, respectively. Thus, the CL 1972, 1982 include integrated memory controller units and include I/O control logic. FIG. 20 illustrates that not only are the memories 1932, 1934 coupled to the CL 1972, 1982, but also that I/O devices 2014 are also coupled to the control logic 1972, 1982. Legacy I/O devices 2015 are coupled to the chipset 1990.

Figure 21:
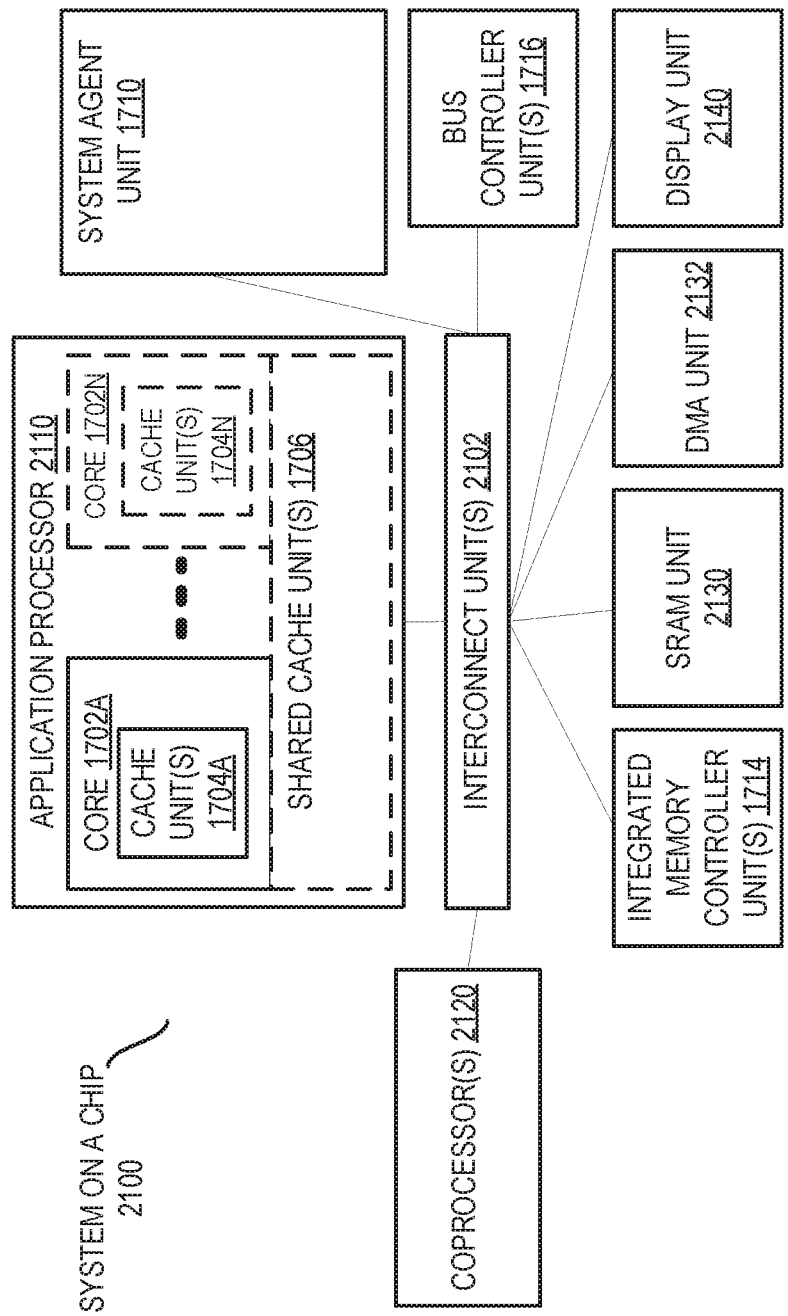

Referring now to FIG. 21, shown is a block diagram of a SoC 2100 in accordance with an embodiment of the present invention. Similar elements in FIG. 17 bear like reference numerals. Also, dashed lined boxes are optional features on more advanced SoCs. In FIG. 21, an interconnect unit(s) 2102 is coupled to: an application processor 2110 which includes a set of one or more cores 1702A-N, which include cache units 1704A-N, and shared cache unit(s) 1706; a system agent unit 1710; a bus controller unit(s) 1716; an integrated memory controller unit(s) 1714; a set or one or more coprocessors 2120 which may include integrated graphics logic, an image processor, an audio processor, and a video processor; an static random access memory (SRAM) unit 2130; a direct memory access (DMA) unit 2132; and a display unit 2140 for coupling to one or more external displays. In one embodiment, the coprocessor(s) 2120 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1930 illustrated in FIG. 19, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 22:
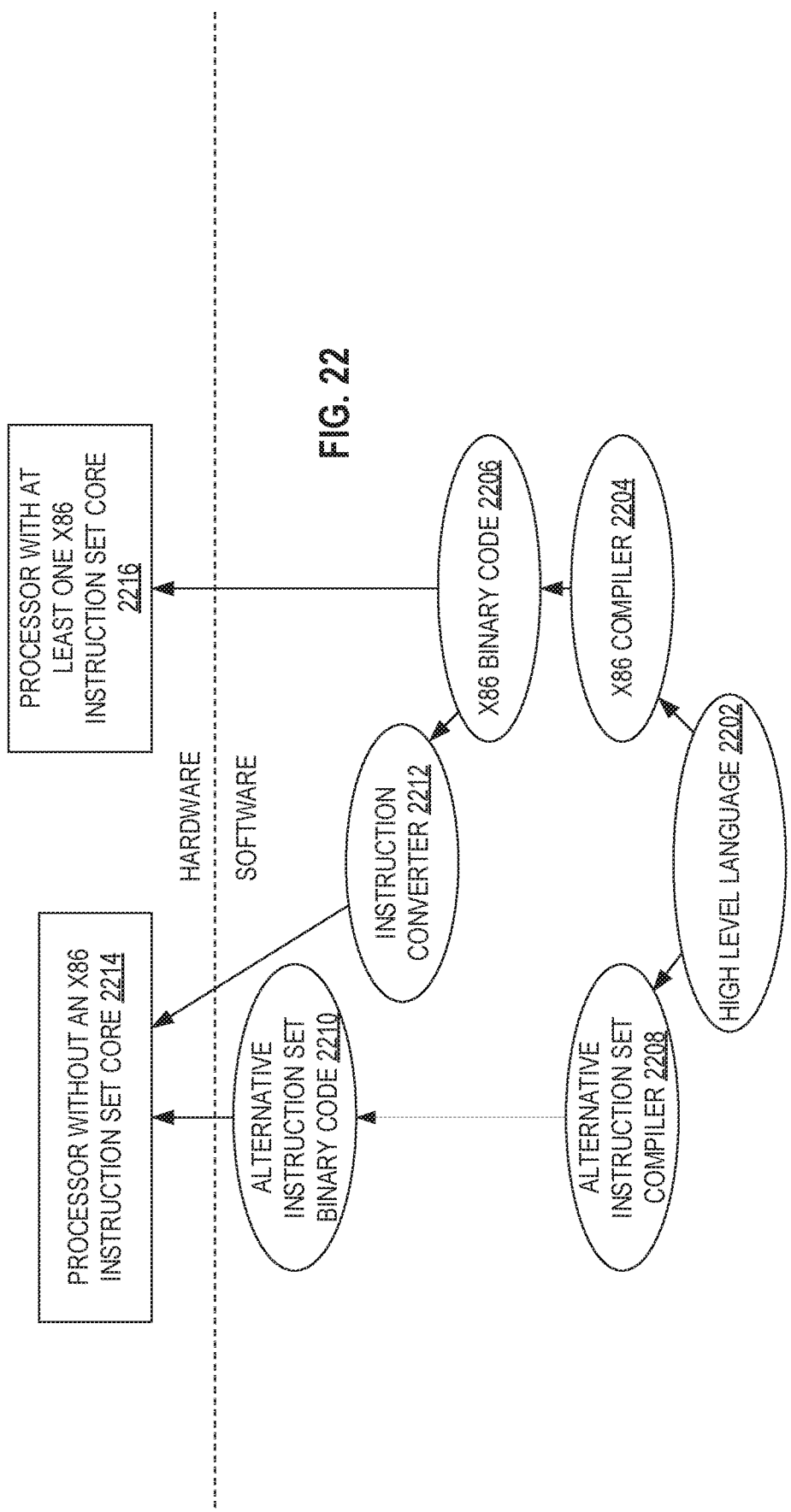
FIG. 22 is a block diagram contrasting the use of a software instruction converter to convert binary instructions in a source instruction set to binary instructions in a target instruction set according to embodiments of the invention.

FIG. 22 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 22 shows a program in a high level language 2202 may be compiled using an x86 compiler 2204 to generate x86 binary code 2206 that may be natively executed by a processor with at least one x86 instruction set core 2216. The processor with at least one x86 instruction set core 2216 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2204 represents a compiler that is operable to generate x86 binary code 2206 (e.g., object code) that can, with or without additional linkage processing, be executed on the processor with at least one x86 instruction set core 2216. Similarly, FIG. 22 shows the program in the high level language 2202 may be compiled using an alternative instruction set compiler 2208 to generate alternative instruction set binary code 2210 that may be natively executed by a processor without at least one x86 instruction set core 2214 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2212 is used to convert the x86 binary code 2206 into code that may be natively executed by the processor without an x86 instruction set core 2214. This converted code is not likely to be the same as the alternative instruction set binary code 2210 because an instruction converter capable of this is difficult to make; however, the converted code will accomplish the general operation and be made up of instructions from the alternative instruction set. Thus, the instruction converter 2212 represents software, firmware, hardware, or a combination thereof that, through emulation, simulation or any other process, allows a processor or other electronic device that does not have an x86 instruction set processor or core to execute the x86 binary code 2206.

FURTHER EXAMPLES

Example 1

A processor comprising: fetch circuitry to fetch a single instruction, a format of the single instruction including a first field to identify a first operand, a second field to identify a second operand, a third field to identify a third operand, and an opcode to indicate that execution circuitry is to determine on a per data element position of the identified first and second operands a maximum or minimum, store the determined maximum or minimums in corresponding data element positions of the identified first operand, and determine and store, in each data element position of the identified third operand, an indication of where the maximum or minimum came from; decode circuitry to decode the fetched single instruction; and execution circuitry to execute the decoded single instruction to determine on a per data element position of the identified first and second operands a maximum or minimum, store the determined maximum or minimums in corresponding data element positions of the identified first operand, and determine and store, in each data element position of the identified third operand, an indication of where the maximum or minimum came from.

Example 2

The processor of example 1, wherein the format of the single instruction further includes a fourth field to identify a fourth operand, the fourth operand to store indices of the second operand to use in a determination of the indication of where the maximum or minimum came from.

Example 3

The processor of any of examples 1-2, wherein the second operand is located in memory.

Example 4

The processor of any of examples 1-2, wherein the second operand is a register.

Example 5

The processor of any of examples 1-2, wherein the indication of where the maximum or minimum of came from is stored as a bit in a writemask register.

Example 6

The processor of any of examples 1-5, wherein the execution circuitry is further to determine a vector parameter associated with the maximum or minimum.

Example 7

The processor of any of examples 1-6, wherein the indication of where the maximum or minimum of came from is stored as a data element in a vector register.

Example 8

A method comprising: decoding a single instruction, a format of the single instruction including a first field to identify a first operand, a second field to identify a second operand, a third field to identify a third operand, and an opcode to indicate that execution circuitry is to determine on a per data element position of the identified first and second operands a maximum or minimum, store the determined maximum or minimums in corresponding data element positions of the identified first operand, and determine and store, in each data element position of the identified third operand, an indication of where the maximum or minimum came from; executing the decoded single instruction to determine on a per data element position of the identified first and second operands a maximum or minimum, store the determined maximum or minimums in corresponding data element positions of the identified first operand, and determine and store, in each data element position of the identified third operand, an indication of where the maximum or minimum came from.

Example 9

The method of example 8, wherein the format of the single instruction further includes a fourth field to identify a fourth operand, the fourth operand to store indices of the second operand to use in a determination of the indication of where the maximum or minimum came from.

Example 10

The method of any of examples 8-9, wherein the second operand is located in memory.

Example 11

The method of any of examples 8-9, wherein the second operand is a register.

Example 12

The method of any of examples 8-9, wherein the indication of where the maximum or minimum of came from is stored as a bit in a writemask register.

Example 13

The method of any of examples 8-9, wherein the executing is further to determine a vector parameter associated with the maximum or minimum.

Example 14

The method of any of examples 8-9, wherein the indication of where the maximum or minimum of came from is stored as a data element in a vector register.

Example 15

A non-transitory machine readable medium having stored thereon an occurrence of a single instruction, wherein in response to the occurrence of the single instruction a processor is to perform a method comprising: decoding the single instruction, a format of the single instruction including a first field to identify a first operand, a second field to identify a second operand, a third field to identify a third operand, and an opcode to indicate that execution circuitry is to determine on a per data element position of the identified first and second operands a maximum or minimum, store the determined maximum or minimums in corresponding data element positions of the identified first operand, and determine and store, in each data element position of the identified third operand, an indication of where the maximum or minimum came from; executing the decoded single instruction to determine on a per data element position of the identified first and second operands a maximum or minimum, store the determined maximum or minimums in corresponding data element positions of the identified first operand, and determine and store, in each data element position of the identified third operand, an indication of where the maximum or minimum came from.

Example 16

The non-transistory machine readable medium of example 15, wherein the format of the single instruction further includes a fourth field to identify a fourth operand, the fourth operand to store indices of the second operand to use in a determination of the indication of where the maximum or minimum came from.

Example 17

The non-transistory machine readable medium of any of examples 15-16, wherein the second operand is located in memory.

Example 18

The non-transistory machine readable medium of any of examples 15-16, wherein the second operand is a register.

Example 19

The non-transistory machine readable medium of any of examples 15-18, wherein the indication of where the maximum or minimum of came from is stored as a bit in a writemask register.

Example 20

The non-transistory machine readable medium of any of examples 15-19, wherein the executing is further to determine a vector parameter associated with the maximum or minimum.

What is claimed is:

1. A processor comprising:
   fetch circuitry to fetch a single instruction, a format of the single instruction including a first field to identify a first operand, a second field to identify a second operand, a third field to identify a third operand, and an opcode to indicate that execution circuitry is to determine on a per data element position of the identified first and second operands a maximum value, store the determined maximum values in corresponding data element positions of the identified first operand, and determine and store, in each data element position of the identified third operand, an indication of where the maximum value came from, and a fourth field to identify a iteration number of a sequence of operations, wherein the first operand is the same throughout the sequence of operations;
   decode circuitry to decode the fetched single instruction; and
   execution circuitry to execute the decoded single instruction to determine on a per data element position of the identified first and second operands a maximum value, store the determined maximum values in corresponding data element positions of the identified first operand, and determine and store, in each data element position of the identified third operand, an indication of where the maximum value came from.

2. The processor of claim 1, wherein the second operand is located in memory.

3. The processor of claim 1, wherein the second operand is a register.

4. The processor of claim 1, wherein the indication of where the maximum value came from is stored as a bit in a writemask register.

5. The processor of claim 1, wherein the execution circuitry is further to determine a vector parameter associated with the maximum value.

6. The processor of claim 1, wherein the indication of where the maximum value came from is stored as a data element in a vector register.

7. A method comprising:
   decoding a single instruction, a format of the single instruction including a first field to identify a first operand, a second field to identify a second operand, a third field to identify a third operand, and an opcode to indicate that execution circuitry is to determine on a per data element position of the identified first and second operands a maximum value, store the determined maximum values in corresponding data element positions of the identified first operand, and determine and store, in each data element position of the identified third operand, an indication of where the maximum value came from, and a fourth field to identify a iteration number of a sequence of operations, wherein the first operand is the same throughout the sequence of operations;
   executing the decoded single instruction to determine on a per data element position of the identified first and second operands a maximum value, store the determined maximum values in corresponding data element positions of the identified first operand, and determine and store, in each data element position of the identified third operand, an indication of where the maximum value came from.

8. The method of claim 7, wherein the second operand is located in memory.

9. The method of claim 7, wherein the second operand is a register.

10. The method of claim 7, wherein the indication of where the maximum value of came from is stored as a bit in a writemask register.

11. The method of claim 7, wherein the executing is further to determine a vector parameter associated with the maximum value.

12. The method of claim 7, wherein the indication of where the maximum value came from is stored as a data element in a vector register.

13. A non-transitory machine readable medium having stored thereon an occurrence of a single instruction, wherein in response to the occurrence of the single instruction a processor is to perform a method comprising:
   decoding the single instruction, a format of the single instruction including a first field to identify a first operand, a second field to identify a second operand, a third field to identify a third operand, and an opcode to indicate that execution circuitry is to determine on a per data element position of the identified first and second operands a maximum value, store the determined maximum values in corresponding data element positions of the identified first operand, and determine and store, in each data element position of the identified third operand, an indication of where the maximum value came from, and a fourth field to identify a iteration number of a sequence of operations, wherein the first operand is the same throughout the sequence of operations;
   executing the decoded single instruction to determine on a per data element position of the identified first and second operands a maximum value, store the determined maximum values in corresponding data element positions of the identified first operand, and determine and store, in each data element position of the identified third operand, an indication of where the maximum value came from.

14. The non-transitory machine readable medium of claim 13, wherein the second operand is located in memory.

15. The non-transitory machine readable medium of claim 13, wherein the second operand is a register.

16. The non-transitory machine readable medium of claim 13, wherein the indication of where the maximum value of came from is stored as a bit in a writemask register.

17. The non-transitory machine readable medium of claim 13, wherein the executing is further to determine a vector parameter associated with the maximum value.

* * * * *